United States Patent
Lee

(10) Patent No.: US 9,651,825 B2
(45) Date of Patent: May 16, 2017

(54) LIQUID CRYSTAL LENS DISPLAY DEVICE WITH LIGHT SHIELD STRUCTURE

(71) Applicant: AU Optronics Corporation, Hsinchu (TW)

(72) Inventor: Seok-Lyul Lee, Hsinchu (TW)

(73) Assignee: AU OPTRONICS CORPORATION, Hsinchu (TW)

( * ) Notice: Subject to any disclaimer, the term of this patent is extended or adjusted under 35 U.S.C. 154(b) by 143 days.

(21) Appl. No.: 14/493,732

(22) Filed: Sep. 23, 2014

(65) Prior Publication Data

US 2016/0085118 A1    Mar. 24, 2016

(51) Int. Cl.
  *G02F 1/1335* (2006.01)
  *G02F 1/1343* (2006.01)
  *G02F 1/139* (2006.01)
  *G02F 1/29* (2006.01)
  *F21V 8/00* (2006.01)

(52) U.S. Cl.
  CPC ...... *G02F 1/133617* (2013.01); *G02F 1/1393* (2013.01); *G02F 1/133512* (2013.01); *G02F 1/133514* (2013.01); *G02F 1/134309* (2013.01); *G02F 1/29* (2013.01); *G02B 6/005* (2013.01); *G02F 2001/134318* (2013.01); *G02F 2202/36* (2013.01)

(58) Field of Classification Search
  CPC ... H01L 33/502; H01L 33/06; H01L 51/5271; H01L 51/5293; C09K 11/02; B82Y 10/00
  USPC .............................. 349/62, 110, 106; 445/24
  See application file for complete search history.

(56) References Cited

U.S. PATENT DOCUMENTS

| | | | |
|---|---|---|---|
| 6,864,626 B1 | 3/2005 | Weiss et al. | |
| 8,120,239 B2 | 2/2012 | Cheon et al. | |
| 8,233,217 B2 | 7/2012 | Kindler et al. | |
| 8,570,450 B2 | 10/2013 | Lee et al. | |
| 9,304,355 B2* | 4/2016 | Lee | H01J 29/90 |
| 2009/0085473 A1* | 4/2009 | Ilzumi | B82Y 20/00 313/504 |
| 2012/0154627 A1 | 6/2012 | Rivard et al. | |
| 2012/0200807 A1 | 8/2012 | Wei et al. | |
| 2013/0038818 A1 | 2/2013 | Toda et al. | |
| 2013/0135558 A1* | 5/2013 | Kim | G02F 1/133528 349/62 |

(Continued)

FOREIGN PATENT DOCUMENTS

CN    103091929 A    5/2013

*Primary Examiner* — Huyen Ngo
(74) *Attorney, Agent, or Firm* — Tim Tingkang Xia, Esq.; Locke Lord LLP

(57) ABSTRACT

A liquid crystal lens display device, which includes a backlight module and a liquid crystal structure. The liquid crystal structure includes a liquid crystal layer, a quantum dot layer, and a light shield structure. The liquid crystal layer defines multiple display pixels, and each display pixel may be switchable between an on state and an off state. The light shield structure includes two shield layers, each having multiple openings and multiple shield portions alternatively positioned. When the display pixel is in the on state, the liquid crystal molecules form at least one liquid crystal lens to refract the light beams, and the refracted light beams penetrate through the openings of the light shield structure to reach the quantum dot layer. When the display pixel is in the off state, the light beams will not be refracted, and will thus be blocked by the light shield structure.

33 Claims, 30 Drawing Sheets

(56) References Cited

U.S. PATENT DOCUMENTS

2015/0145405 A1\* 5/2015 Yang ................... H01L 27/3211
                                                                         313/498

\* cited by examiner

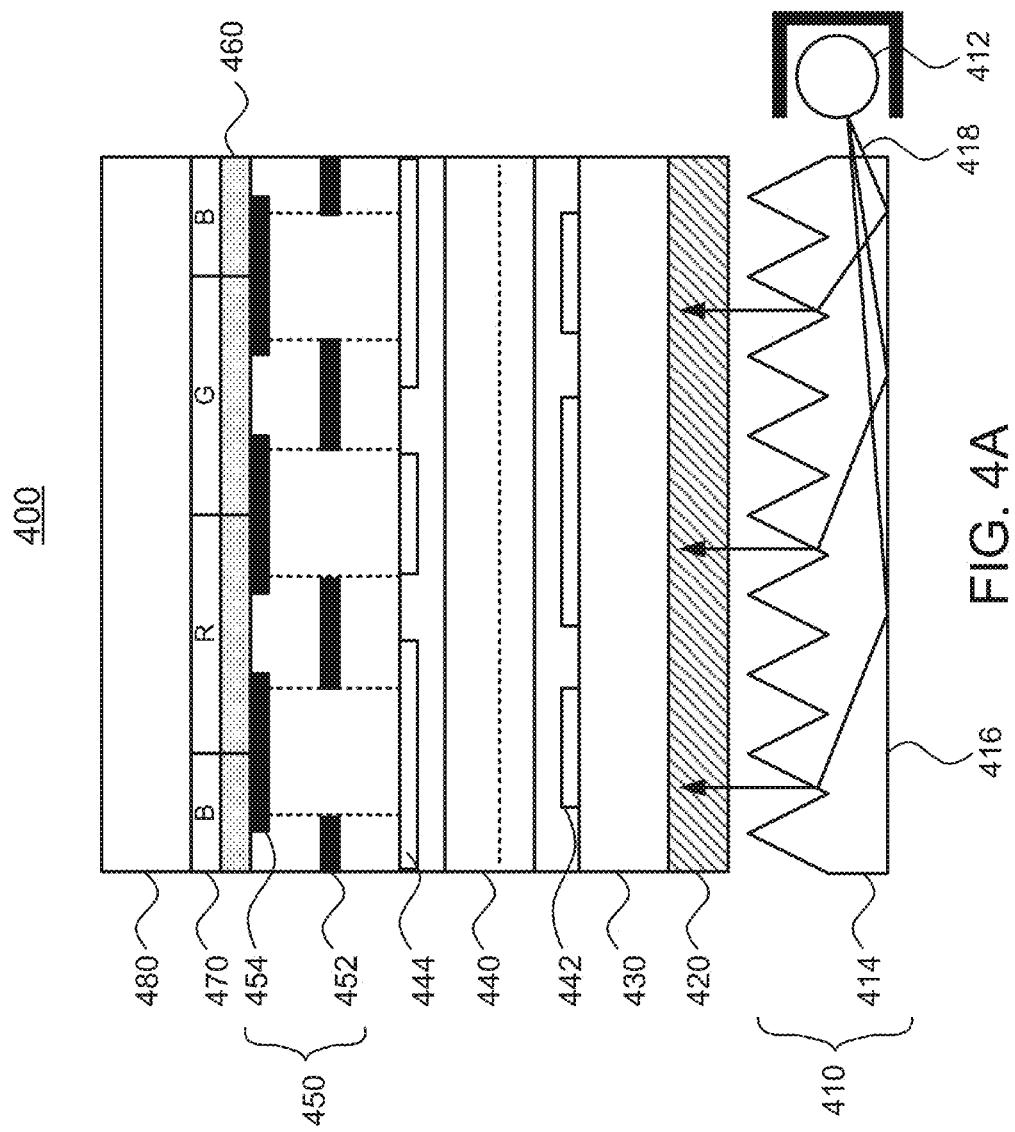

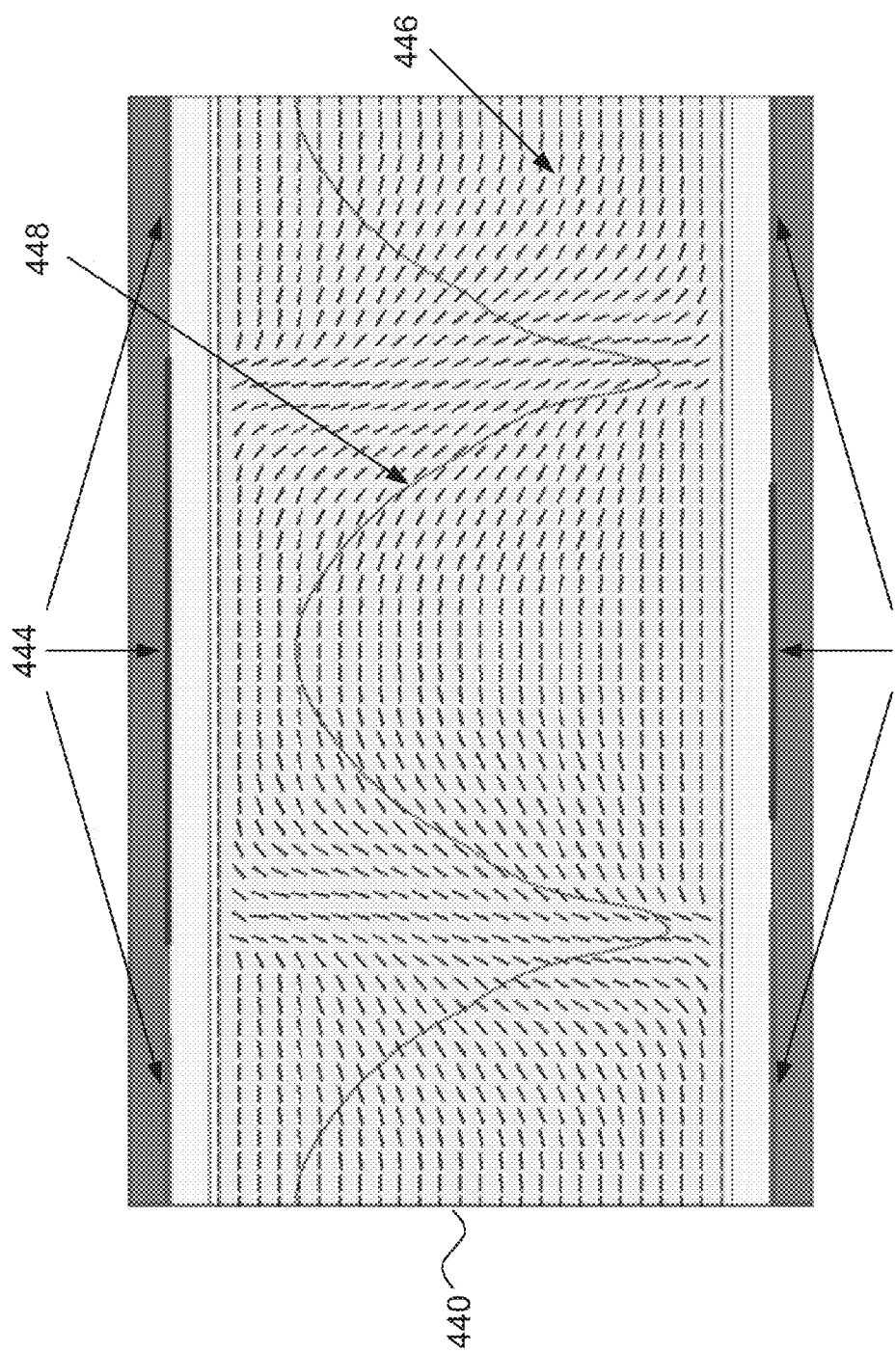

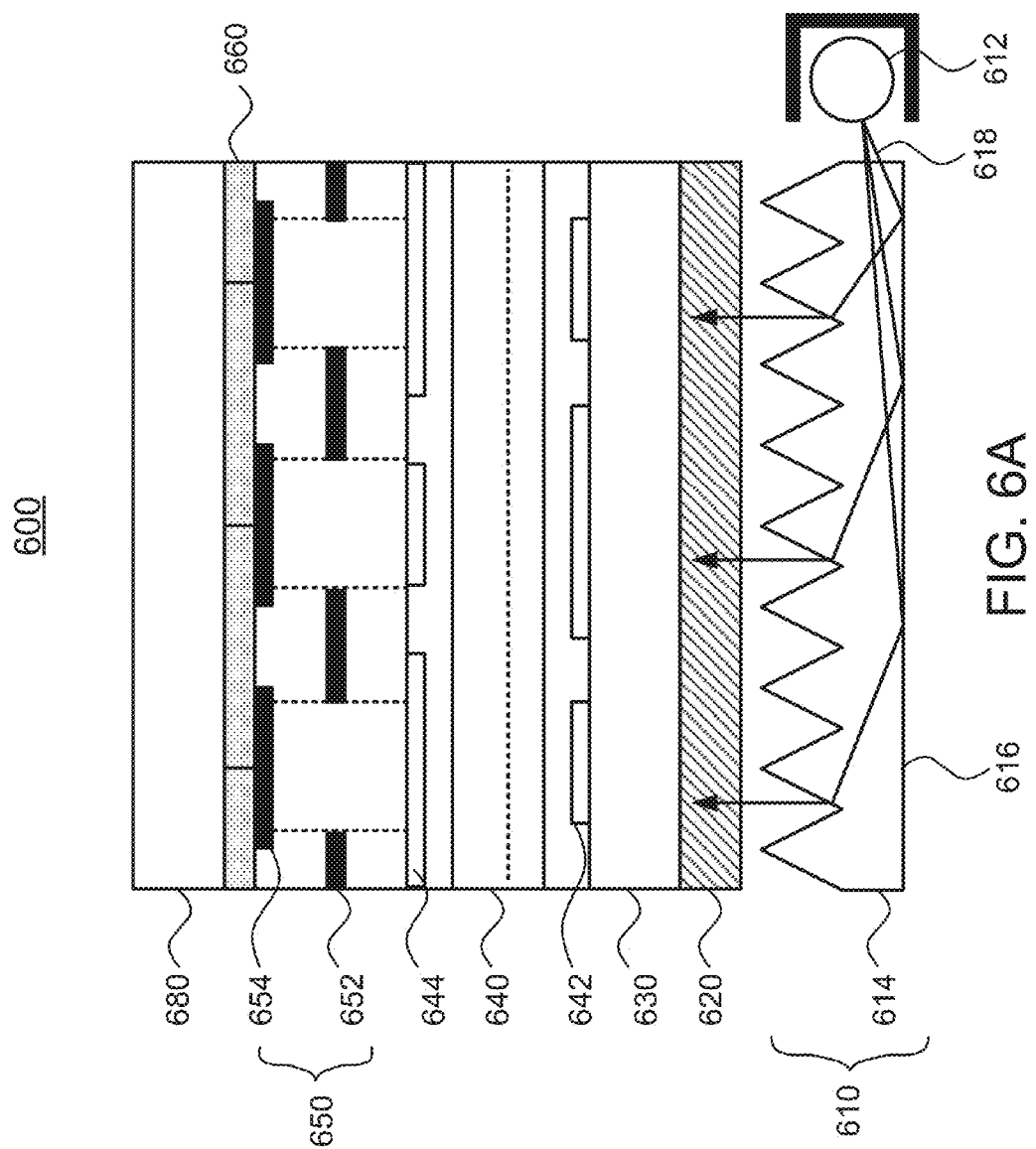

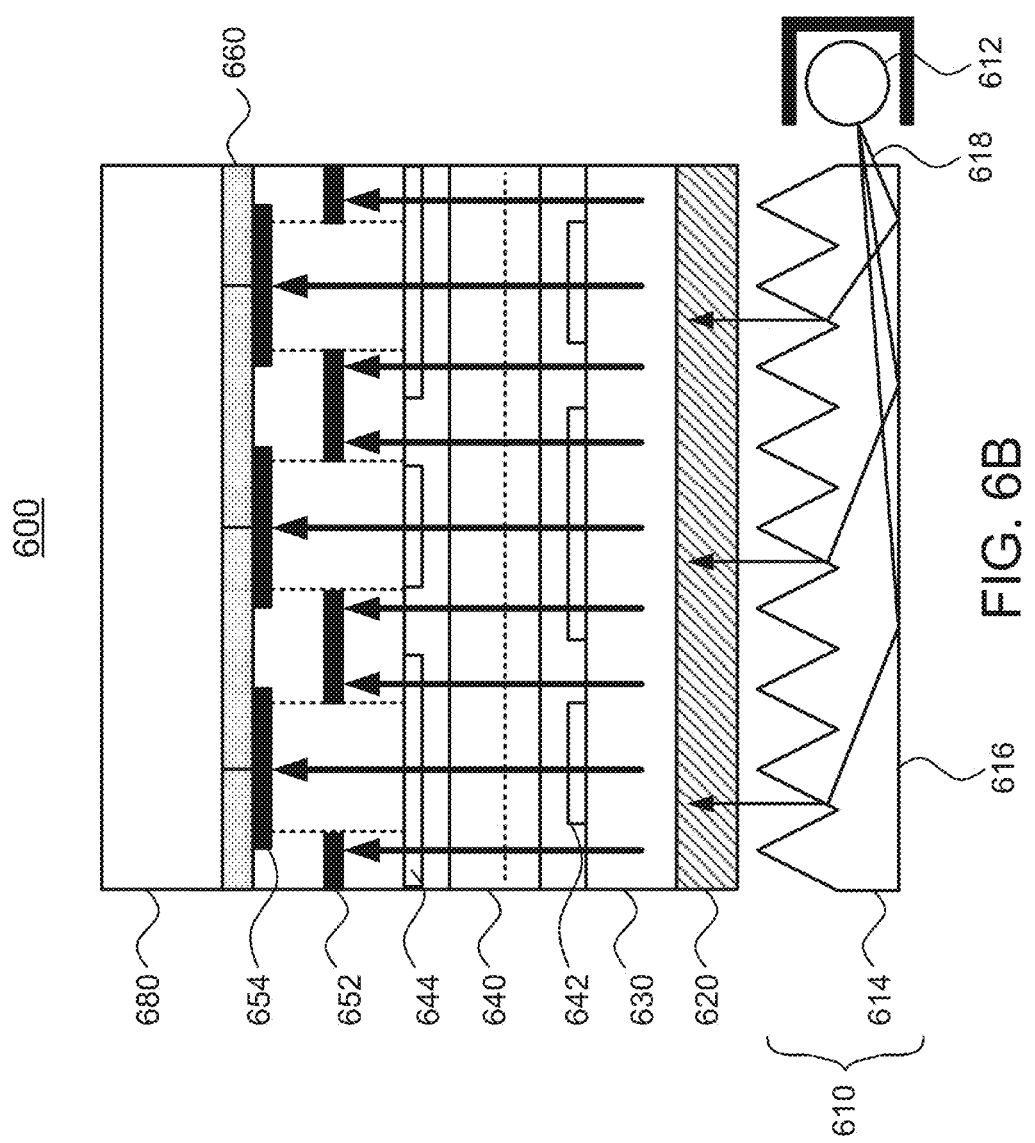

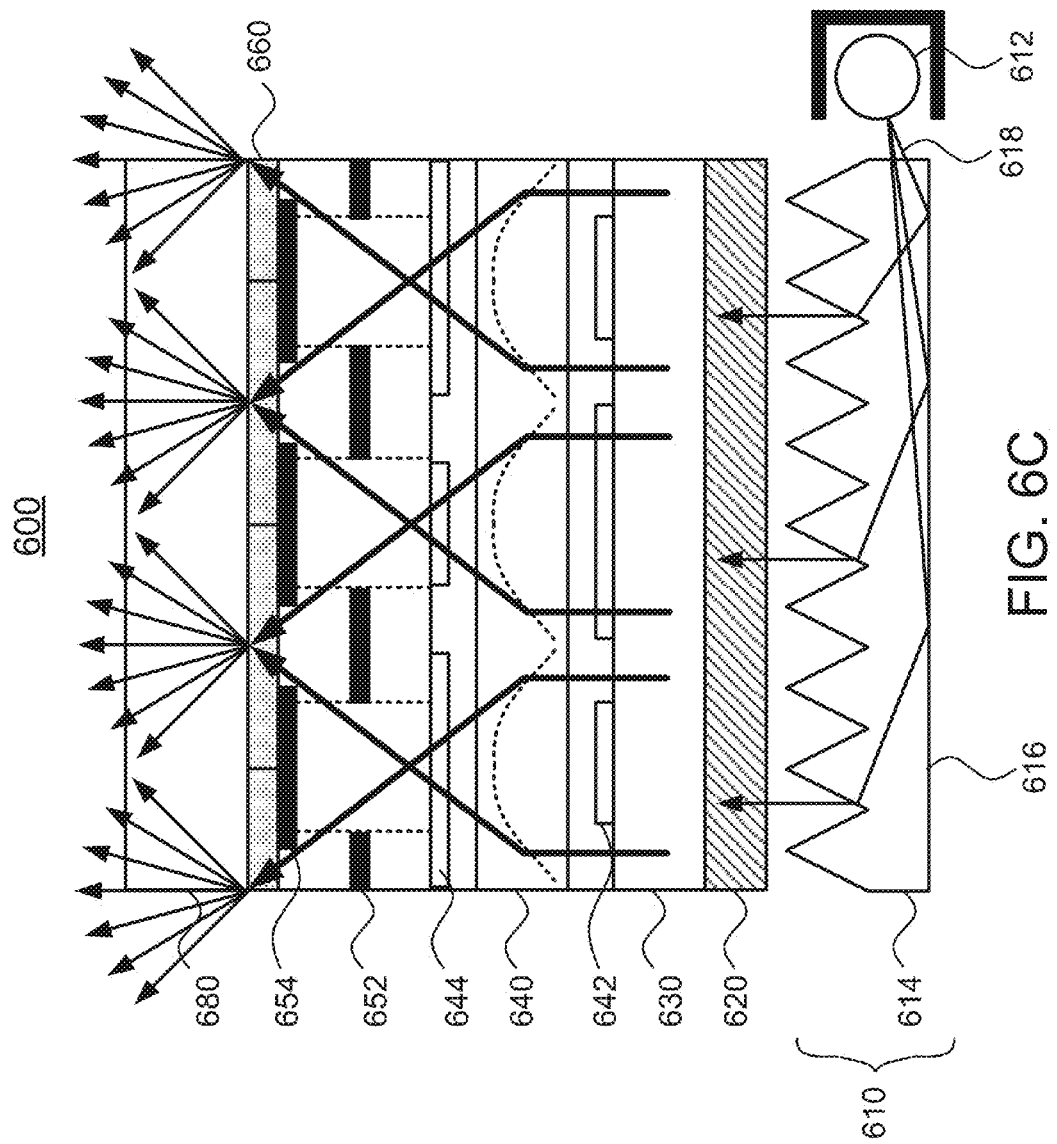

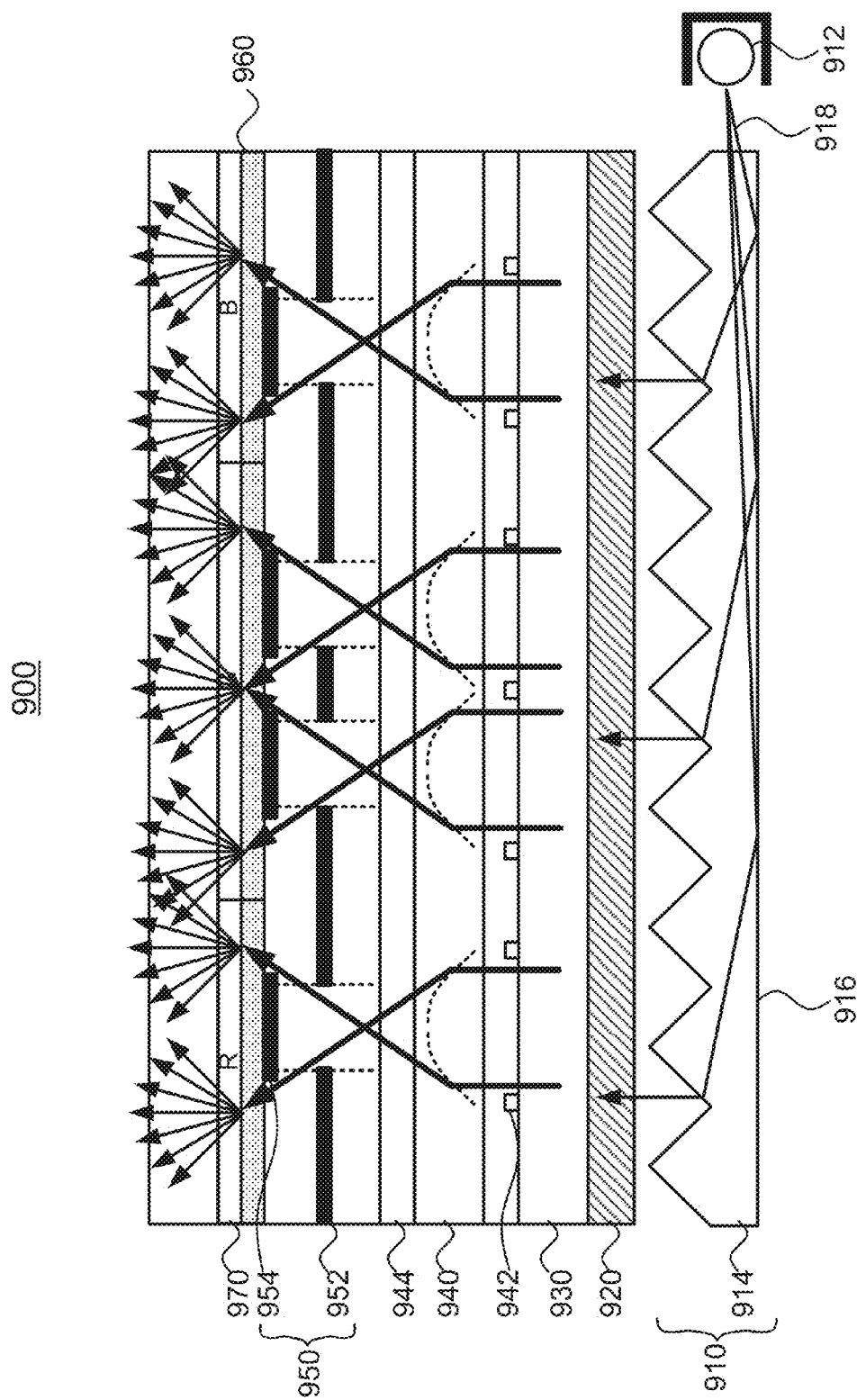

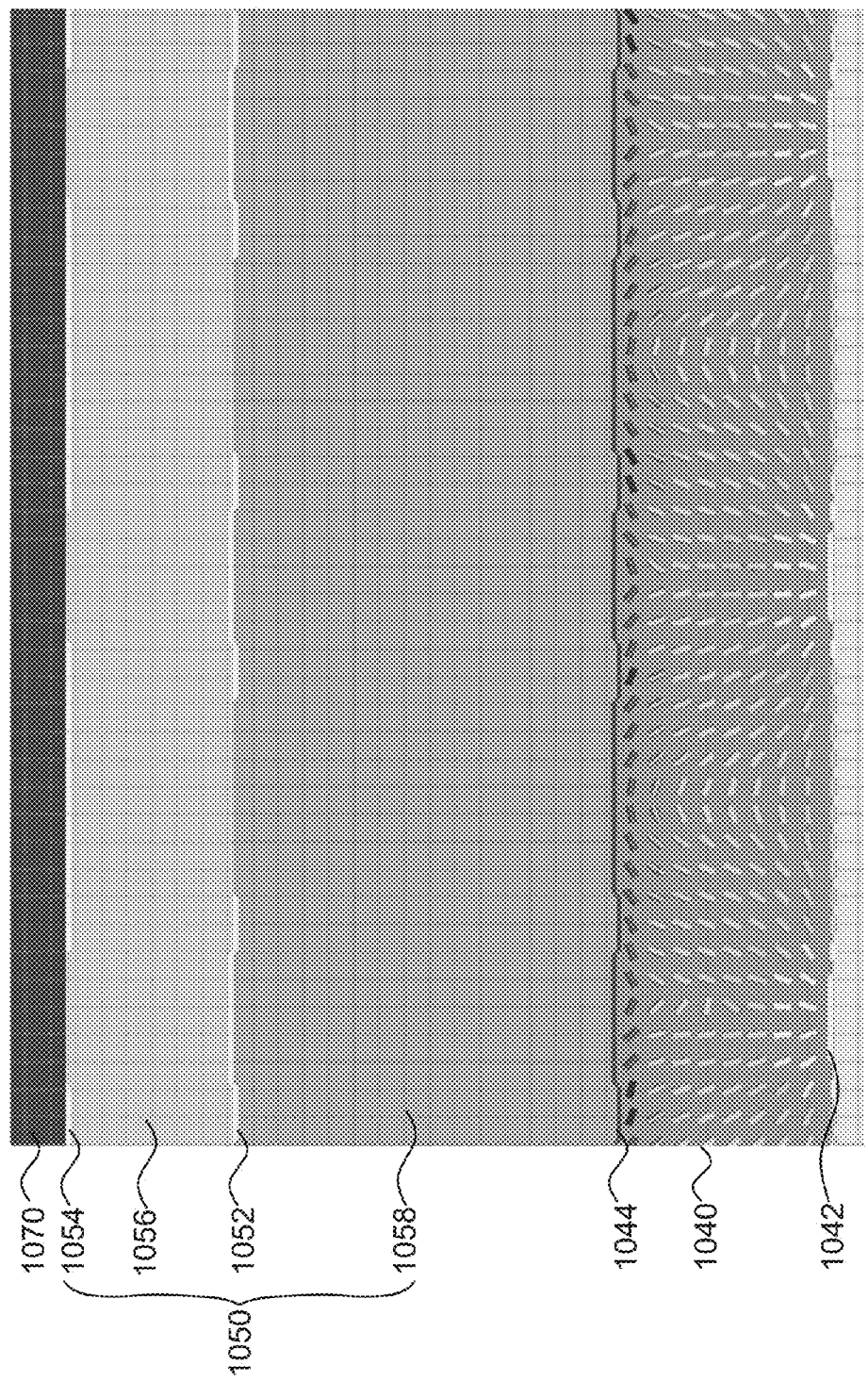

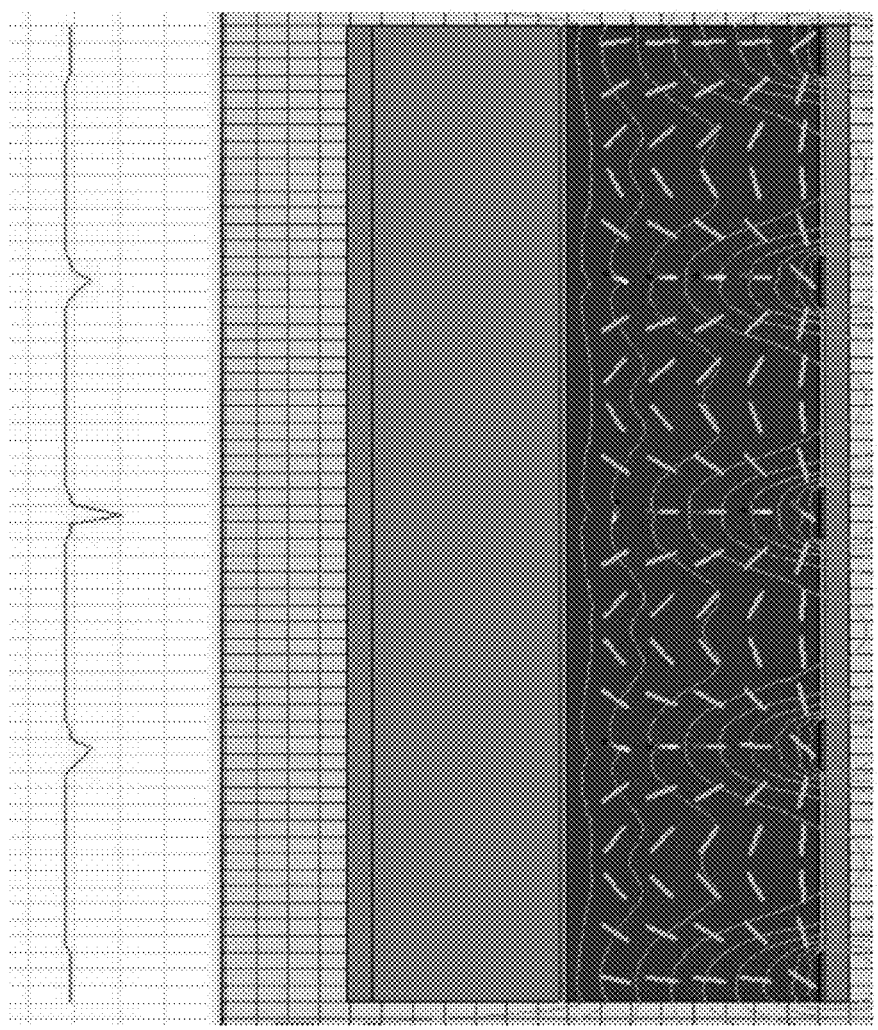

LIQUID CRYSTAL LENS DISPLAY DEVICE WITH LIGHT SHIELD STRUCTURE

FIELD OF THE DISCLOSURE

The disclosure relates generally to display technology, and more particularly to liquid crystal lens display devices using light shields and quantum dots to improve optical efficiency thereof.

BACKGROUND OF THE DISCLOSURE

Currently, liquid crystal displays (LCDs) are commonly used as display devices. The LCD is capable of displaying images with good quality while consuming lower electrical power, and is thus used often as the display devices of battery powered electronic devices, such as laptop computers, mobile phones, digital cameras and other portable devices.

In one example, a typical LCD device may include a backlight module, a diffusion film, a plurality of polarizers, a liquid crystal layer between the polarizers, and transparent electrodes for driving the liquid crystal molecules of the liquid crystal layer. If the LCD device is a color LCD device, the LCD device may also include a color filter (CF) layer. In such a color LCD device, light emitted from the backlight module will be guided to pass the diffusion film, one of the polarizers, the liquid crystal layer and the transparent electrodes, the CF layer, and the other of the polarizers, before exiting the LCD device.

However, the performance of the LCD device is generally limited by its optical efficiency. Currently, the stack structures of the LCD device generally have an optical efficiency of only about 3~5%. Specifically, when the light is emitted by the backlight module and passes through the diffusion film, the polarizers, the liquid crystal layer and the transparent electrodes, and the CF layer, the light will be partially absorbed by each of the layers. In this case, when the light exits the stack structures of the LCD device, the optical efficiency of the light will be reduced to about 3~5%.

Therefore, a heretofore unaddressed need exists in the art to address the aforementioned deficiencies and inadequacies.

SUMMARY OF THE DISCLOSURE

One aspect of the disclosure relates to a liquid crystal lens display device, which includes: (a) a first substrate and a second substrate positioned apart to define a cell gap therebetween; (b) a polarizer disposed on an opposite side of the first substrate to the cell gap; (c) a liquid crystal layer formed by liquid crystal molecules and positioned in the cell gap, defining a plurality of display pixels, where each of the display pixels of the liquid crystal layer is configured to be switchable between an on state and an off state; (d) a quantum dot layer positioned in the cell gap between the liquid crystal layer and the second substrate; (e) a backlight module disposed at an opposite side of the polarizer to the cell gap, configured to emit a bunch of blue light beams towards the polarizer to enter the liquid crystal layer; and (f) a light shield structure positioned in the cell gap between the liquid crystal layer and the quantum dot layer, where the light shield structure includes: (i) a first shield layer positioned apart from the liquid crystal layer, wherein the first shield layer has a plurality of first openings and a plurality of first shield portions; and (ii) a second shield layer positioned between and apart from the first shield layer and the liquid crystal layer, where the second shield layer has a plurality of second openings and a plurality of second shield portions such that each display pixel of the liquid crystal layer corresponds to at least one of the second openings, and where each of the second openings corresponds to one of the first shield portions, and each of the second openings is narrower than the corresponding one of the first shield portions.

In certain embodiments, the first shield layer and the second shield layer are positioned such that, for each display pixel of the liquid crystal layer, when the display pixel is in the on state and the liquid crystal molecules of the display pixel are driven to have a predetermined retardation to form at least one liquid crystal lens, a portion of the blue light beams are refracted by the at least one liquid crystal lens to directly penetrate through one of the second openings and one of the first openings to reach the quantum dot layer.

In certain embodiments, the first shield layer and the second shield layer are positioned such that, for each display pixel of the liquid crystal layer, when the display pixel is in the on state and the liquid crystal molecules of the display pixel are driven to have a predetermined retardation to form at least one liquid crystal lens, a portion of the blue light beams are refracted by the at least one liquid crystal lens to penetrate through one of the second openings, and then be reflected between the first shield portions of the first shield layer and the second shield portions of the second shield layer, before penetrating through one of the first openings to reach the quantum dot layer.

In certain embodiments, the liquid crystal lens display device further includes a color filter (CF) layer disposed between the quantum dot layer and the second substrate.

In certain embodiments, the liquid crystal lens display device further includes: a plurality of first transparent electrodes disposed on the first substrate; and a plurality of second transparent electrodes disposed on a far side of the liquid crystal layer from the first substrate, where each display pixel corresponds to at least one of the first transparent electrodes and at least one of the second transparent electrodes, such that the corresponding first and second transparent electrodes to each display pixel, when given a predetermined voltage difference therebetween, are configured to switch the display pixel to the on state by driving the liquid crystal molecules of the display pixel to have the predetermined retardation to form the at least one liquid crystal lens.

In certain embodiments, the backlight module includes: a blue light source configured to emit the blue light beams; a light guide structure configured to guide the blue light beams towards the polarizer; and a reflection sheet configured to reflect the blue light beams within the light guide structure.

In certain embodiments, each of the at least one liquid crystal lens is a convex lens having a focal length F. In one embodiment, the focal length F is about 11 um. In certain embodiments, the second shield layer is positioned apart from the liquid crystal layer such that a distance between the at least one liquid crystal lens and the second openings of the second shield layer is about the focal length F.

In another aspect of the present disclosure, a liquid crystal structure for a liquid crystal lens display device is provided. In certain embodiments, the liquid crystal structure includes: (a) a first substrate and a second substrate positioned apart to define a cell gap therebetween; (b) a liquid crystal layer formed by liquid crystal molecules and positioned in the cell gap, defining a plurality of display pixels, where each of the display pixels of the liquid crystal layer is configured to be switchable between an on state and an off state; (c) a quantum dot layer positioned in the cell gap between the liquid crystal layer and the second substrate; and (d) a light shield structure positioned in the cell gap between the liquid crystal layer and the quantum dot layer, where the light shield structure includes: (i) a first shield layer positioned apart from the liquid crystal layer, wherein the first shield layer has a plurality of first openings and a plurality of first shield portions; and (ii) a second shield layer positioned between and apart from the first shield layer and the liquid crystal layer, where the second shield layer has a plurality of second openings and a plurality of second shield portions such that each display pixel of the liquid crystal layer corresponds to at least one of the second openings, and where along a first direction substantially perpendicular to the liquid crystal layer, each of the second openings corresponds to one of the first shield portions, and each of the second openings is narrower than the corresponding one of the first shield portions. In certain embodiments, a bunch of blue light beams is configured to be emitted towards the liquid crystal structure to enter the liquid crystal structure.

In certain embodiments, the first shield layer and the second shield layer are positioned such that, for each display pixel of the liquid crystal layer, when the display pixel is in the on state and the liquid crystal molecules of the display pixel are driven to have a predetermined retardation to form at least one liquid crystal lens, a portion of the blue light beams are refracted by the at least one liquid crystal lens to directly penetrate through one of the second openings and one of the first openings to reach the quantum dot layer.

In certain embodiments, the first shield layer and the second shield layer are positioned such that, for each display pixel of the liquid crystal layer, when the display pixel is in the on state and the liquid crystal molecules of the display pixel are driven to have a predetermined retardation to form at least one liquid crystal lens, a portion of the blue light beams are refracted by the at least one liquid crystal lens to penetrate through one of the second openings, and then be reflected between the first shield portions of the first shield layer and the second shield portions of the second shield layer, before penetrating through one of the first openings to reach the quantum dot layer.

In certain embodiments, the liquid crystal structure further includes a polarizer disposed on an opposite side of the first substrate to the cell gap; and a color filter (CF) layer disposed between the quantum dot layer and the second substrate.

In certain embodiments, the liquid crystal lens display device further includes: a plurality of first transparent electrodes disposed on the first substrate; and a plurality of second transparent electrodes disposed on a far side of the liquid crystal layer from the first substrate, where each display pixel corresponds to at least one of the first transparent electrodes and at least one of the second transparent electrodes, such that the corresponding first and second transparent electrodes to each display pixel, when given a predetermined voltage difference therebetween, are configured to switch the display pixel to the on state by driving the liquid crystal molecules of the display pixel to have the predetermined retardation to form the at least one liquid crystal lens.

In certain embodiments, each of the at least one liquid crystal lens is a convex lens having a focal length F. In certain embodiments, the second shield layer is positioned apart from the liquid crystal layer such that a distance between the at least one liquid crystal lens and the second openings of the second shield layer is about the focal length F. In one embodiment, the focal length F is about 11 um.

In a further aspect of the present disclosure, a method of forming a liquid crystal structure for a liquid crystal lens display device is provided. In certain embodiments, the method includes: (a) positioning a first substrate and a second substrate apart to define a cell gap therebetween; (b) forming a quantum dot layer in the cell gap; (c) forming a light shield structure in the cell gap between the first substrate and the quantum dot layer, where the light shield structure includes: (i) a first shield layer having a plurality of first openings and a plurality of first shield portions; and (ii) a second shield layer positioned apart from the first shield layer, where the second shield layer has a plurality of second openings and a plurality of second shield portions; and (d) filling liquid crystal molecules in the cell gap between the first substrate and the light shield structure to form a liquid crystal layer in the cell gap, where the liquid crystal layer defines a plurality of display pixels, each display pixel corresponding to at least one of the second openings, and where each of the plurality of display pixels is configured to be switchable between an on state and an off state; where the liquid crystal layer is positioned apart from the first shield layer and the second shield layer, and where each of the second openings corresponds to one of the first shield portions, and each of the second openings is narrower than the corresponding one of the first shield portions. In certain embodiments, a bunch of blue light beams is configured to be emitted towards the polarizer to enter the liquid crystal structure.

In certain embodiments, the method further includes: forming a polarizer on an opposite side of the first substrate to the cell gap; and forming a color filter (CF) layer between the quantum dot layer and the second substrate.

In certain embodiments, the method further includes: forming a plurality of first transparent electrodes on the first substrate; and forming a plurality of second transparent electrodes on a far side of the liquid crystal layer from the first substrate, where each display pixel corresponds to at least one of the first transparent electrodes and at least one of the second transparent electrodes, such that the corresponding first and second transparent electrodes to each display pixel, when given a predetermined voltage difference therebetween, are configured to switch the display pixel to the on state by driving the liquid crystal molecules of the display pixel to have the predetermined retardation to form the at least one liquid crystal lens.

In certain embodiments, each of the at least one liquid crystal lens is a convex lens having a focal length F, and the second shield layer is positioned apart from the liquid crystal layer such that a distance between the at least one liquid crystal lens and the second openings of the second shield layer is about the focal length F.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein:

FIG. 4A schematically shows a cross-sectional view of a liquid crystal lens display device using a light shield structure and a quantum dot sheet according to one embodiment of the disclosure.

FIG. 5 schematically shows retardation of the liquid crystal molecules of the liquid crystal layer of the liquid crystal lens display device when the display pixel is in an on state according to one embodiment of the disclosure.

FIG. 6A schematically shows a cross-sectional view of a liquid crystal lens display device using a light shield structure and a quantum dot sheet according to another embodiment of the disclosure.

FIG. 6B schematically shows the liquid crystal lens display device of FIG. 6A, where the display pixel is in an off state.

FIG. 6C schematically shows the liquid crystal lens display device of FIG. 6A, where the display pixel is in an on state.

FIG. 9A schematically shows a cross-sectional view of a liquid crystal lens display device using a light shield structure and a quantum dot sheet according to a further embodiment of the disclosure, where the display pixel is in an on state.

FIG. 10A shows a plan view, and FIG. 10B shows a perspective view.

FIG. 17B schematically shows a cross-sectional view of the liquid crystal structure as shown in FIG. 16 according to one embodiment of the disclosure, where the liquid crystal layer is in an on state.

FIG. 18A shows that the liquid crystal layer is in an off state, and FIG. 18B shows that the liquid crystal layer is in an on state.

FIG. 18C shows simulated liquid crystal molecule orientation for ne calculation of the focal length F of the liquid crystal lens according to one embodiment of the disclosure.

DETAILED DESCRIPTION OF THE DISCLOSURE

Figure 1:
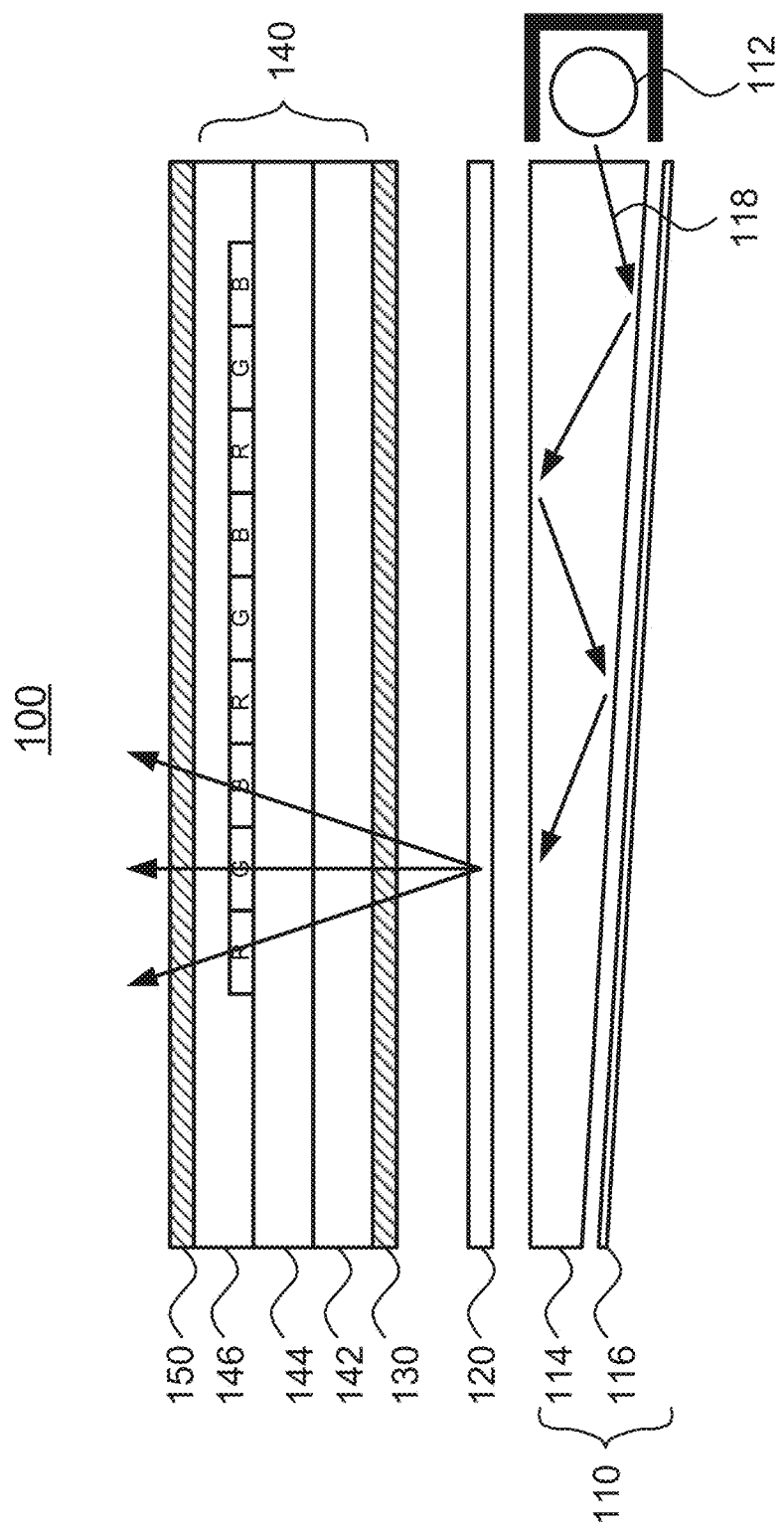
FIG. 1 schematically shows a cross-sectional view of a liquid crystal display device according to one embodiment of the disclosure.

The present disclosure will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom", "upper" or "top", and "left" and "right", may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "tower", can therefore, encompasses both an orientation of "lower" and "upper", depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 2.0 percent, preferably within 10 percent, and more preferably within 5 percent of a given value or range. Numerical quantities given herein are approximate, meaning that the term "around", "about" or "approximately" can be inferred if not expressly stated.

The description will be made as to the embodiments of the present disclosure in conjunction with the accompanying drawings in FIGS. 1-20. In accordance with the purposes of this disclosure, as embodied and broadly described herein, this disclosure, in one aspect, relates to a liquid crystal lens display apparatus having a specific light shield and quantum dot arrangements to enhance light efficiency thereof.

FIG. 1 schematically shows a cross-sectional view of a liquid crystal display device according to one embodiment of the disclosure. As shown in FIG. 1, the LCD device 100 may include a backlight module 110, a diffusion film 120, two polarizers 130 and 150, and a liquid crystal element 140 between the polarizers 130 and 150. Specifically, the backlight module 110 includes a light source 112, a reflection sheet 114, a light guide plate 116, and the reflection sheet 114 is disposed on the bottom surface (or namely an outside surface) of the light guide plate 114. In certain embodiments, the liquid crystal element 140 may include multiple layers, such as a thin-film transistor (TFT) layer 142 on a first base (not shown), a liquid crystal molecule layer (or namely a liquid crystal layer having liquid crystal molecules) 144, and a color filter (CF) layer 146 on a second base (not shown). In certain embodiments, the color filter layer 146 adopts the RGB color model, which includes a plurality of color filters for displaying the three primary colors of red (R), green (G) and blue (B), such that the color filters may be arranged to provide a broad array of colors by mixing the three primary colors. In certain embodiments, a plurality of transparent electrodes (not shown) may be provided in the liquid crystal element 140 for driving the liquid crystal molecules of the liquid crystal layer 144. It should be noted that the layers of the LCD device 100 are provided solely for illustrative purposes, and the relative sizes and positions of the layers may vary. Further, although some layers are illustrated with gaps therebetween, the actual structure of the LCD device 100 may be positioned to have gaps or have no gaps between the layers.

As shown in FIG. 1, in the backlight module 110, when the light (as shown by the arrows 118) is emitted by the light source 112, the light will be reflected by the reflection sheet 116 and guided by the light guide plate 114 towards the diffusion film 120. When the light passes through the diffusion film 120, the diffusion film 120 slightly reduces the optical efficiency of the light to about 90%. The diffused light would then pass through one of the polarizers 130, the liquid crystal layer 140, and the other of the polarizers 150. In this process, the diffused light would be partially absorbed by the two layers of polarizers 130 and 150, greatly reducing the optical efficiency of the light to about 36%. Further, the liquid crystal layer 140 may further reduce the optical efficiency of the light. For example, the liquid crystal molecule layer 142 and the transparent electrodes as well as the TFT layer 144 would further reduce the optical efficiency of the light to about 18%. Moreover, the CF layer 146 is also absorptive to the light, resulting in the light having the optical efficiency of only about 3~5% when the light exits the liquid crystal stacks of the LCD device.

Figure 2B:
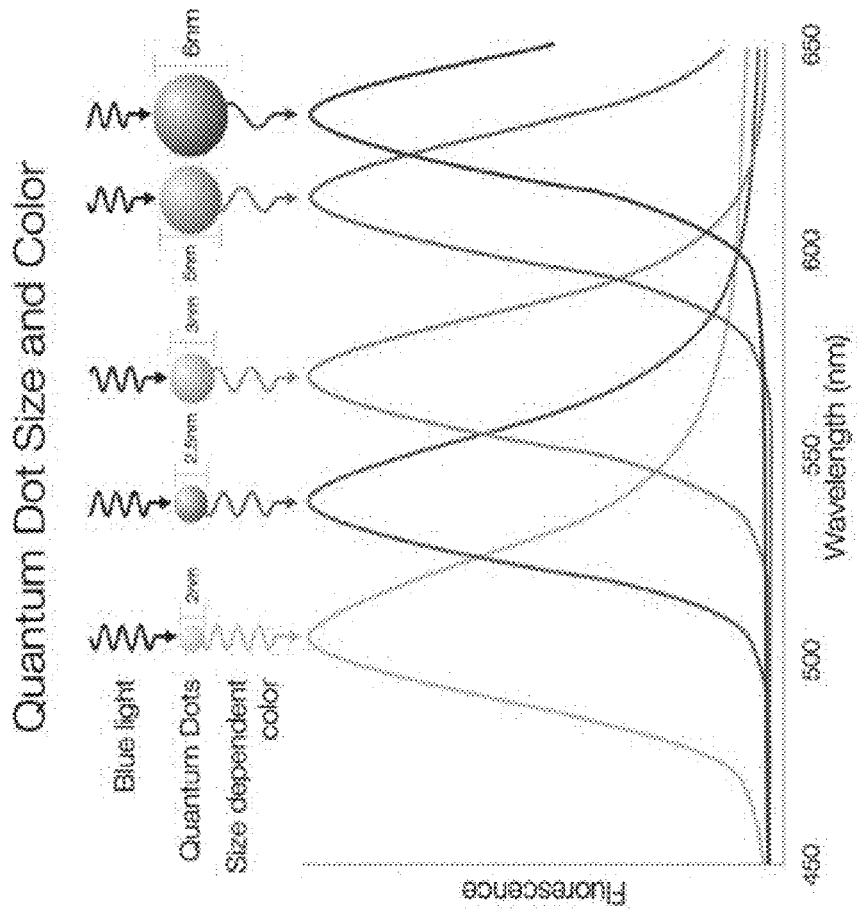
FIG. 2B schematically shows the size-dependent emission feature of excited quantum dots according to one embodiment of the present disclosure.
Figure 2A:
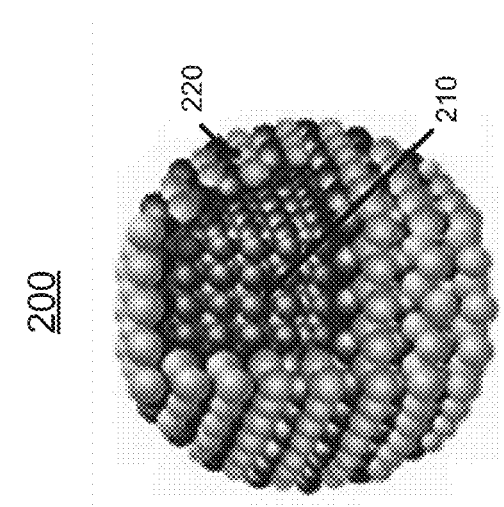
FIG. 2A schematically shows a quantum dot structure according to one embodiment of the present disclosure.

Different technology and structures have been considered for the purpose of improving the display quality of the color LCD devices. For example, quantum dot technology may be used in the color LCD devices to improve the color gamut. A quantum dot is a nanocrystal core/shell structure made of semiconductor materials that are small enough to exhibit quantum mechanical properties. For example, the size of a quantum dot may be about 1-10 nm in diameter. FIG. 2A schematically shows a quantum dot structure according to one embodiment of the present disclosure. As shown in FIG. 2A, the quantum dot 200 has a plurality of core nanocrystals 210 and a plurality of shell nanocrystals 220. Specifically, the excitons of the quantum dots are confined in all three spatial dimensions. The electronic properties of the quantum dot materials are intermediate between those of hulk semiconductors and of discrete molecules. In certain embodiments, the quantum dots can be synthesized with larger (thicker) shells, which may be directly correlated to the spectroscopic properties of the particles like lifetime, emission intensity, and long-term stability.

One of the optical properties of the quantum dots relates to the size-dependent emission feature. Specifically, when a quantum dot is excited by a light at a certain wavelength, the light emitted by the excited quantum dot is determined by the crystal size of the quantum dot. More specifically, when the size of the quantum dot becomes larger, the fluorescence spectrum of the emission moves toward the red light (longer wavelength). FIG. 2B schematically shows the size-dependent emission feature of excited quantum dots according to one embodiment of the present disclosure. As shown in FIG. 2B, five quantum dots (A, B, C, D, E from left to right) having different sizes of nanocrystals are simultaneously excited by an incident light having the wavelength of 365 nm (which is in the range of violet light), and the emissions of the five quantum dots (A, B, C, D, F) are shown to have different wavelengths, ranging from about 450 nm to about 650 nm, which substantially cover the wavelength range of the visible spectrum. In other words, the emission of the quantum dots may include the three primary colors of R (620-750 nm of wavelength), G (495-570 nm), and B (450-495 nm). In certain embodiments, the full width at half maximum (FWHM) of the quantum dots may be about 30-40 nm. Generally, the quantum dots have high quantum yields of about 90%.

Figure 3A:
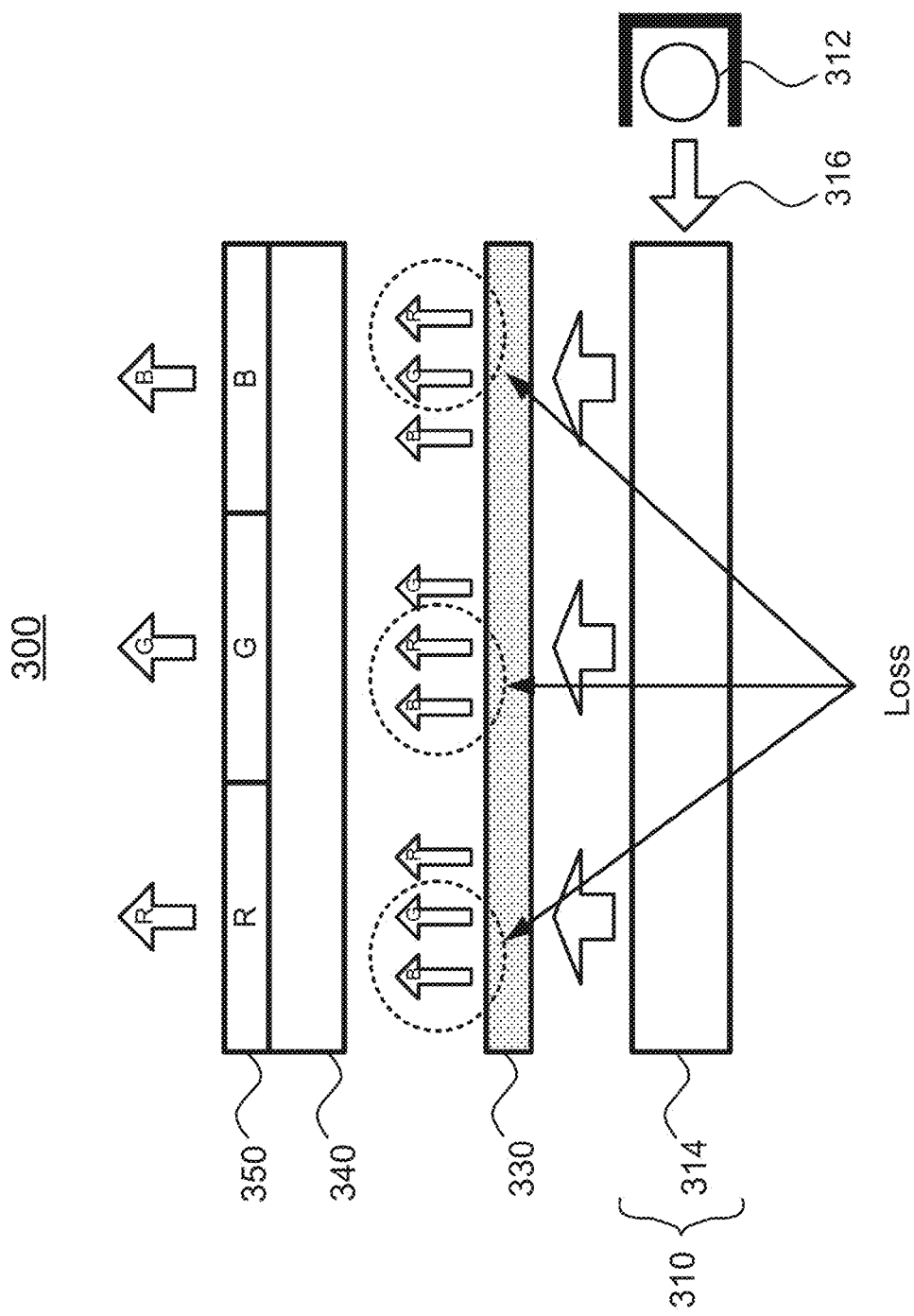
FIG. 3A schematically shows a cross-sectional view of a liquid crystal display device using a quantum dot sheet according to one embodiment of the disclosure.

FIG. 3A schematically shows a cross-sectional view of a liquid crystal display device using a quantum dot sheet according to one embodiment of the disclosure. As shown in FIG. 3A, the LCD device 300 may include a backlight module 310, a quantum dot sheet 330, a liquid crystal element 340, a CF layer 350, and the CF layer 350 is disposed on the liquid crystal element 340. It should be noted that the LCD device 300 uses the quantum dot sheet 330 to replace the polarizer. In certain embodiments, the LCD device 300 may also include a diffusion film (not shown) between the backlight module 310 and the quantum dot sheet 330. Specifically, the backlight module 310 includes a blue light source 312 and a light guide plate 314. In certain embodiments, the backlight module 310 may also include a reflection sheet (not shown), which is disposed on the bottom surface (or namely the outside surface) of the light guide plate 314. It should be noted that the layers of the LCD device 300 are provided solely for illustrative purposes, and the relative sizes and positions of the layers may vary. Further, although some layers are illustrated with gaps therebetween, the actual structure of the LCD device 300 may be positioned to have gaps or have no gaps between the layers.

As shown in FIG. 3A, the blue light source 312 is configured to emit a blue light 316, which has a wavelength in the range of 450-495 nm. In an alternative embodiment, the light source 312 may be UV-light source or other suitable light sources. As discussed above, the quantum dots with different nanocrystal sizes may be used to generate the three primary colors of RGB. Thus, by arranging the quantum dots in the quantum dot sheet 330 to have different nanocrystal sizes, the quantum dot sheet 330 may generate light of the three primary colors of RGB using the blue light 316 as the incident light. When the blue light 316 passes through the quantum dot sheet 330, lights of the three primary colors of RGB may be generated.

Figure 3B:
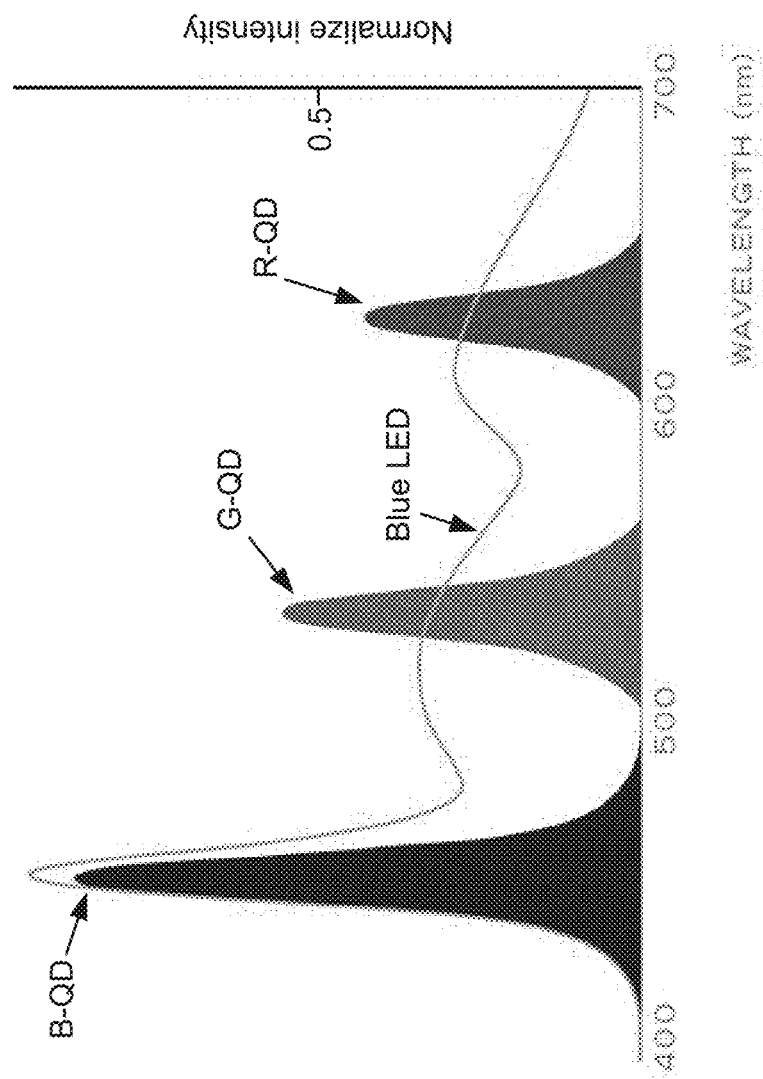
FIG. 3B schematically shows the optical efficiency of the liquid crystal display device using a quantum dot sheet according to one embodiment of the disclosure.

However, merely using the quantum dot sheet 330 in the LCD device 300 does not improve the optical efficiency of the LCD device 300. FIG. 3B schematically shows the optical efficiency of the liquid crystal display device using a quantum dot sheet according to one embodiment of the disclosure. The chart as shown in FIG. 3B is obtained based on the National Television System Committee (NTSC) standard, in which the color gamut may be improved from 72% to 109%. However, while the blue light (B-QD) maintains desired optical performance, the optical efficiency of the green light (G-QD) and the red light (R-QD) may be improved.

Based on the above description, one aspect of the disclosure relates to a liquid crystal lens display device, which utilizes the quantum dot sheets together with a light shield structure to improve the optical efficiency of the LCD device.

FIG. 4A schematically shows a cross-sectional view of a liquid crystal lens display device using a light shield structure and a quantum dot sheet according to one embodiment of the disclosure. As shown in FIG. 4A, the liquid crystal lens display device 400 includes a backlight module 410 and a liquid crystal structure. Specifically, the liquid crystal structure includes a polarizer 420, a first substrate 130, a liquid crystal layer 440, a light shield structure 450, a quantum dot layer 460, a CF layer 470, and a second substrate 480. In certain embodiments, the liquid crystal lens display device 400 may further include a plurality of first transparent electrodes 442 disposed on the first substrate 430, and a plurality of second transparent electrodes 444 disposed on a far side of the liquid crystal layer 440 from the first substrate 430. Ire other words, the liquid crystal layer 440 is sandwiched between the first substrate 430 and the second transparent electrodes 444 such as the first substrate 430 and the second transparent electrodes 444 is disposed on the two contrary surfaces (upper and bottom surfaces) of the liquid crystal layer 440 respectively. It should be noted that the layers of the liquid crystal lens display device 400 are provided solely for illustrative purposes, and the relative sizes and positions of the layers may vary. Further, although some layers are illustrated with gaps therebetween, the actual structure of the liquid crystal lens display device 400 may be positioned to have gaps or have no gaps between the layers.

In certain embodiments, the first substrate 430 and the second substrate 480 are positioned apart to define a cell gap therebetween. In certain embodiments, the first substrate 430 and the second substrate 480 may be formed by desired transparent substrate materials. For example, the first substrate 430 and the second substrate 480 may be transparent substrates, such as glass, plastic substrate or other suitable substrates.

The backlight module 410 is disposed at an opposite side of the polarizer 420 to the cell gap. In other words, the backlight module 410 is disposed under the outside surface of the polarizer 420, and the polarizer 420 is disposed under the outside surface of the first substrate 430. As shown in FIG. 4A, the backlight module 410 includes a blue light source 412, a reflection sheet 416 and a light guide structure 414. The blue light source 412 is configured to emit a bunch of blue light beams 418 as the incident light for the liquid crystal structure. In an alternative embodiment, the blue light source 412 may be a UV light source or other suitable light sources. In certain embodiments, the blue light source 412 may be a blue light emitting diode (LED). The light guide structure 414 is configured to guide the blue light beams 418 towards the polarizer 420, and the reflection sheet 416 is disposed under the bottom surface of the light guide structure 416 and is configured to reflect the blue light beams 418 within the light guide structure 416. In certain embodiments, the reflection sheet 416 and the light guide structure 414 may be similar to the reflection sheet 114 and the light guide plate 116 as shown in FIG. 1.

The polarizer 420 is disposed on an opposite side of the first substrate 430 to the cell gap, such that the blue light beams 418 emitted from the backlight module 410 are guided towards the polarizer 420 to enter the liquid crystal structure along a predetermined direction, such as the perpendicular direction as shown in FIG. 4A. In other words, the blue light beams 418 are guided towards the polarizer 420 to enter the liquid crystal structure along a predetermined direction which is substantially perpendicular to the liquid crystal layer 440, for example. It should be noted that, in comparison to the LCD device 100 as shown in FIG. 1, there is no polarizer on the outside side of the second substrate 480 of the liquid crystal lens display device 400. If there is any polarizer on the outside side of the second substrate 480 of the liquid crystal lens display device 400, light passing through the LCD device 400 may be deviated by the polarizer from the intended light passing direction to eyes, thus reducing image quality.

The liquid crystal layer 440 is formed by liquid crystal molecules and positioned in the cell gap, defining a plurality of display pixels. Specifically, FIG. 4A shows only one display pixel. In certain embodiments, each of the display pixels of the liquid crystal layer is configured to be switchable between an on state and an off state, which will be explained later.

The tight shield structure 450 is positioned in the cell gap between the liquid crystal layer 440 and the quantum dot layer 460. In other words, the light shield structure 150 is sandwiched between the second transparent electrodes 444 and the quantum dot layer 460. Specifically, the light shield structure 450 includes two shield layers: (i) a first shield layer 454 positioned apart from the liquid crystal layer 440 and (ii) a second shield layer 452 positioned between and apart from the first shield layer 454 and the liquid crystal layer 440. In other words, the first shield layer 454 is positioned far from the liquid crystal layer 440, and the second shield layer 452 is positioned between the liquid crystal layer 440 and the first shield layer 454. In detail, the quantum dot layer 460 is disposed on the inner surface of the second substrate 480, and the first shield layer 454 is disposed on the quantum dot layer 460, a first dielectric layer (not shown) is covered and disposed on the first shield layer 454, the second shield layer 452 is disposed on the first dielectric layer (not shown), a second dielectric layer (not shown) is covered and disposed on the second shield layer 452, and the second transparent electrodes are disposed on the second dielectric layer (not shown). In other words, the first dielectric layer (not shown) is sandwiched between the first shield layer 454 and the second shield layer 452 such as the first shield layer 454 and the second shield layer 452 are disposed on the two opposite surfaces (upper and bottom surfaces) of the first dielectric layer (not shown) respectively, and the second dielectric layer (not shown) is sandwiched between the second shield layer 452 and the second transparent electrodes 444 such as the second shield layer 452 and the second transparent electrodes 444 are disposed on the two opposite surfaces (upper and bottom surfaces) of the second dielectric layer (not shown) respectively. In certain embodiments, one of the first and second dielectric layers has a single or multilayer structures, and the materials of the dielectric layers include inorganic materials (such as silicon nitride, silicon oxide, silicon oxy-nitride, or others), organic materials (such as benezocy-clobutenep (BCB), polyimide (PI), polyester, or other polymers), or other suitable materials. Each of the first shield layer 454 and the second shield layer 452 has a plurality of alternatively arranged openings and shield portions. Specifically, the first shield layer 454 has a plurality of first openings and a plurality of first shield portions (as shown in black). The second shield layer 452 has a plurality of second openings and a plurality of second shield portions (as shown in black). Each display pixel of the liquid crystal layer may correspond boat least one of the second openings such that the light may pass through the second openings. Moreover, along the first direction substantially perpendicular to the liquid crystal layer 440 (i.e., the perpendicular direction as shown in FIG. 4A), each of the second openings of the second shield layer 452 may correspond to one of the first shield portions of the first shield layer 454, each of the first openings of the first shield layer 454 may correspond to one of the second shield portions of the second shield layer 452, each of the second openings of the second shield layer 452 is narrower than the corresponding one of the first shield portions of the first shield layer 454, and each of the first openings of the first shield layer 454 is narrower than the corresponding one of the second shield portions of the second shield layer 452. In other words, if the blue light beams penetrate through the liquid crystal layer 440 along the perpendicular direction, the blue light beams would be block either by one of the first shield portions of the first shield layer 454, and by one of the second shield portions of the second shield layer 452.

In certain embodiments, the liquid crystal lens display device 400 further includes the CF layer 470, and the quantum dot layer 460 is positioned in the cell gap between the light shield structure 450 and the CF layer 470. In other words, the CF layer 470 and the first light shield layer 454 are disposed on two opposite surfaces (upper and bottom surfaces) of the quantum dot layer 460 respectively. In certain embodiments, the quantum dot layer 460 may be a quantum dot sheet, which is similar to the quantum dot sheet 330 as shown in FIG. 3A. In certain embodiments, the CF layer 470 may be disposed on the outside surface of the second substrate 480. In certain embodiments, by arranging the quantum dots in the quantum dot layer 460 to have different nanocrystal sizes, the quantum dot layer 460 may generate light of the three primary colors of RGB using the blue light 418 as the incident light.

The CF layer 470 is disposed between the quantum dot layer 460 and the second substrate 480. In certain embodiments, the CF layer 470 adopts the RGB color model, which includes a plurality of color filters for displaying the three primary colors of red (R), green (G) and blue (B) or any other colors (such as yellow, white, etc.), such that the color filters may be arranged to provide a broad array of colors by mixing the three primary colors.

As discussed above, each of the display pixels of the liquid crystal layer 440 is configured to be switchable between an on state and an off state. This is achieved by the first and second transparent electrodes 442 and 444. Specifically, each of the first transparent electrodes 442 and the second transparent electrodes 444 may be provided with a desired voltage such that a predetermined voltage difference may be obtained between the first transparent electrodes 442 and the second transparent electrodes 444, forming an electric field. The electric field may drive the liquid crystal molecules of the liquid crystal layer 440 to have a predetermined retardation to form a plurality of liquid crystal lenses, thus switching the display pixel from the off state to the on state.

Figure 4B:
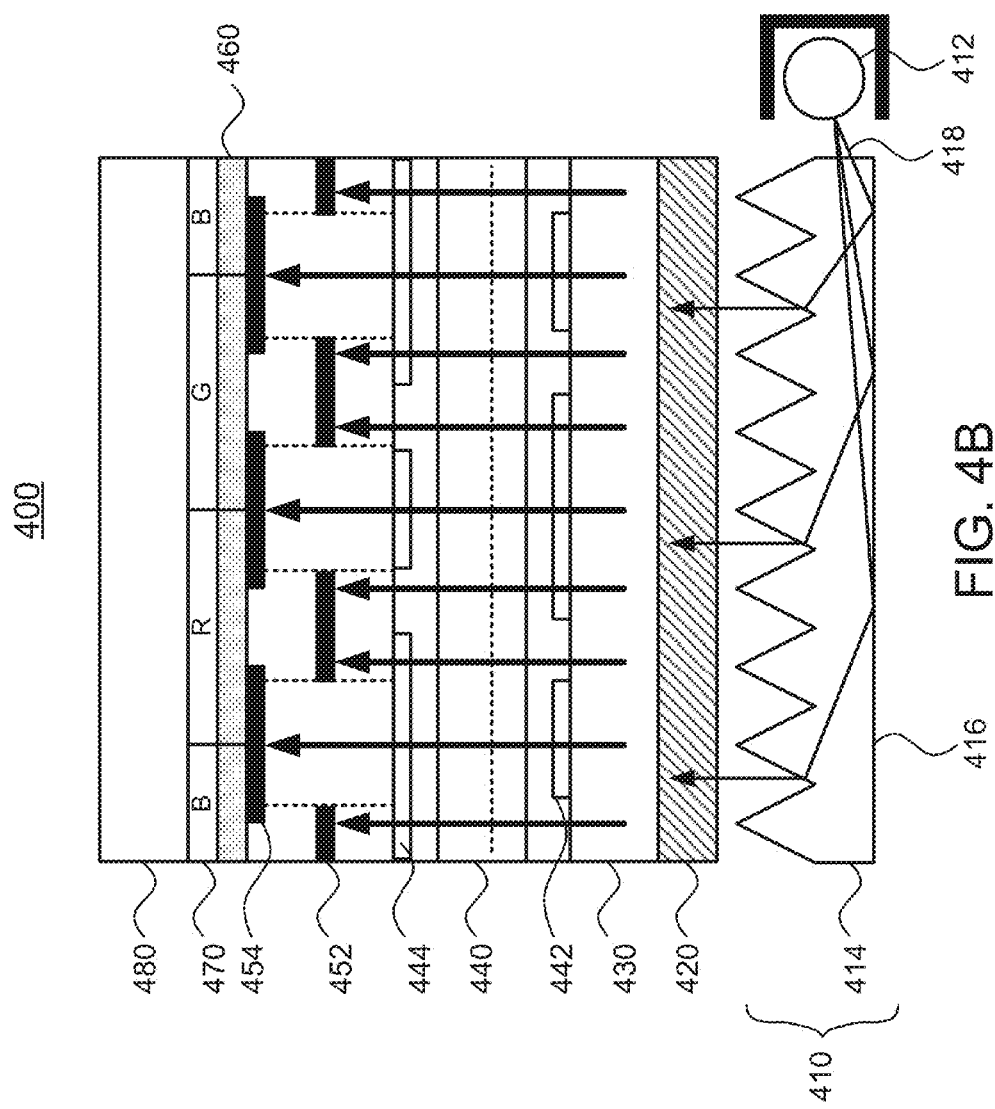
FIG. 4B schematically shows the liquid crystal lens display device of FIG. 4A, where the display pixel is in an off state.

FIG. 4B schematically shows the liquid crystal lens display device of FIG. 4A, where the display pixel is in an off state. As shown in FIG. 4B, when the display pixel is in the off state, the liquid crystal molecules of the liquid crystal layer 440 allow the blue light beams passing through the display pixel to penetrate the liquid crystal molecules along the perpendicular direction (i.e., the first direction substantially perpendicular to the liquid crystal layer 440) without being refracted. In this case, each of the blue light beams passing through the liquid crystal layer 440 is blocked by one of the first shield portions of the first shield layer 454 and by one of the second shield portions of the second shield layer 452 without reaching the quantum dot layer 460. In other words, when the display pixel is in the off state, no incident light reaches the quantum dot layer 460.

Figure 4C:
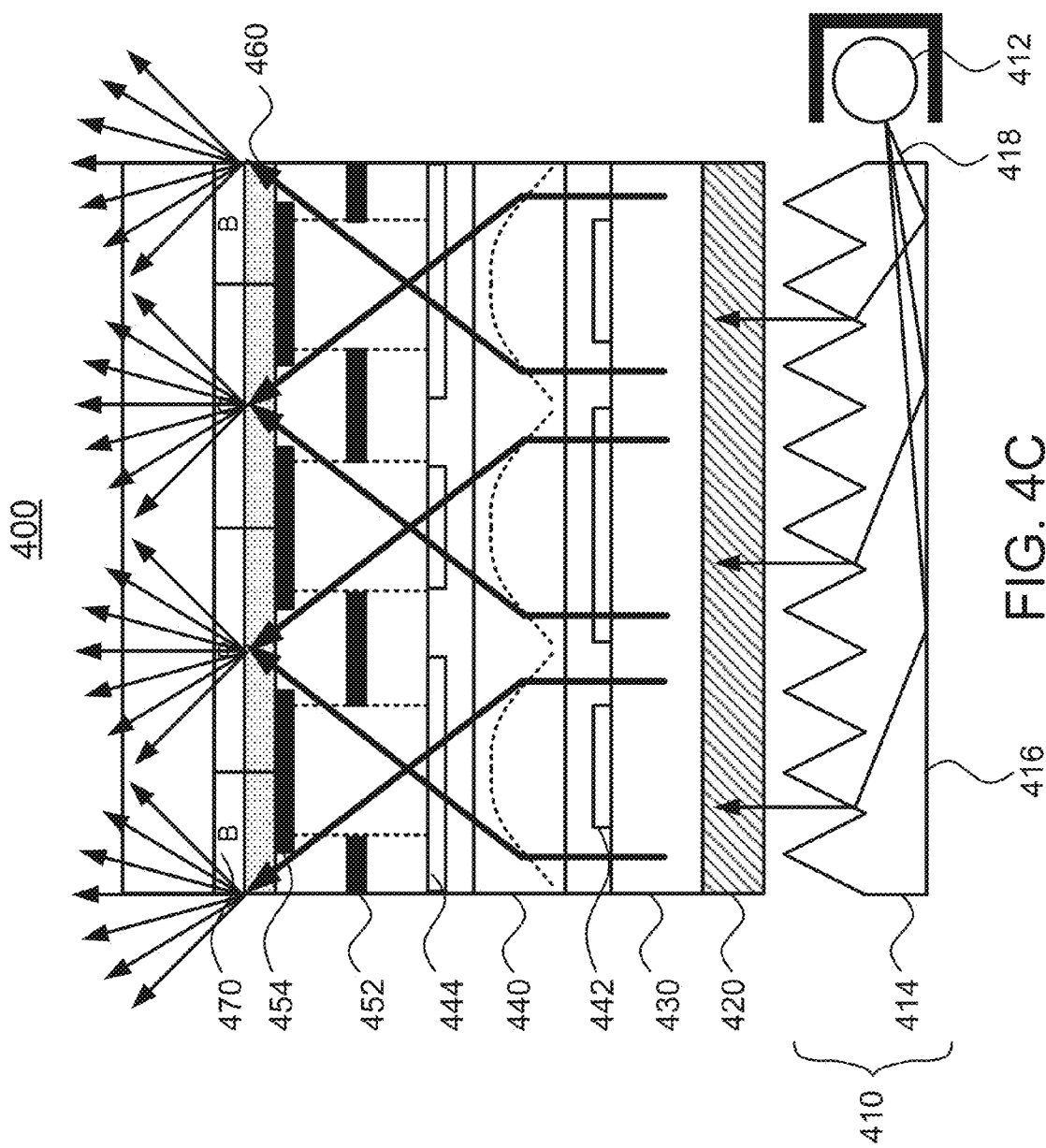
FIG. 4C schematically shows the liquid crystal lens display device of FIG. 4A, where the display pixel is in an on state.

FIG. 4C schematically shows the liquid crystal lens display device of FIG. 4A, where the display pixel is in an on state. As shown in FIG. 4C, when the display pixel is in the on state, the liquid crystal molecules of the liquid crystal layer 440 are driven by the first and second transparent electrodes 442 and 444 to have a predetermined retardation to form the liquid crystal lenses. In this case, the blue light beams passing through the liquid crystal layer 440 are refracted by the liquid crystal lenses formed by the liquid crystal molecules having the predetermined retardation, such that a portion of the refracted blue light beams penetrate through one of the second openings of the second shield layer 452 and one of the first openings of the first shield layer 454 to reach the quantum dot layer 460. In other words, when the display pixel is in the on state, a portion of the blue light beams would be refracted to pass through the light shield structure 450 to reach the quantum dot layer 460.

FIG. 5 schematically shows retardation of the liquid crystal molecules of the liquid crystal layer of the liquid crystal lens display device when the display pixel is in an on state according to one embodiment of the disclosure. As shown in FIG. 5, when a predetermined voltage difference is obtained between the first transparent electrodes 442 and the second transparent electrodes 444, the liquid crystal molecules 446 of the liquid crystal layer 440 rotates due to the electric field generated by the predetermined voltage difference, thus forming the liquid crystal lens 448.

FIG. 6A schematically shows a cross-sectional view of a liquid crystal lens display device using a light shield structure and a quantum dot layer according to another embodiment of the disclosure. As shown in FIG. 6A, the liquid crystal lens display device 600 includes a backlight module 610 and a liquid crystal structure. Specifically, the liquid crystal structure includes a polarizer 620, a first substrate 630, a liquid crystal layer 640, a light shield structure 650, a quantum dot layer 660, and a second substrate 680. In certain embodiments, the liquid crystal lens display device 600 may further include a plurality of first transparent electrodes 642 disposed on the first substrate 630, and a plurality of second transparent electrodes 644 disposed on a far side of the liquid crystal layer 640 from the first substrate 630. It should be noted that the layers of the liquid crystal lens display device 600 are provided solely for illustrative purposes, and the relative sizes and positions of the layers may vary. Further, although some layers are illustrated with gaps therebetween, the actual structure of the liquid crystal lens display device 600 may be positioned to have gaps or have no gaps between the layers. It should be noted that the liquid crystal lens display device 600 as shown in FIG. 6A includes almost identical structures to the liquid crystal lens display device 400 as shown in FIG. 4A, except that the liquid crystal lens display device 600 as shown in FIG. 6A does not have the CF layer, and no polarizer is provided on the outside surface of the second substrate 680. Therefore, details of the structures of the liquid crystal lens display device 600 are hereinafter omitted.

FIG. 6B schematically shows the liquid crystal lens display device of FIG. 6A, where the display pixel is in an off state. As shown in FIG. 6B, when the display pixel is in the off state, the liquid crystal molecules of the liquid crystal layer 640 allow the blue light beams passing through the display pixel to penetrate the liquid crystal molecules along the perpendicular direction (i.e., the first direction substantially perpendicular to the liquid crystal layer 640) without being refracted. In this case, each of the blue light beams passing through the liquid crystal layer 640 is blocked by one of the first shield portions of the first shield layer 654 and by one of the second shield portions of the second shield layer 652 without reaching the quantum dot layer 660. In other words, when the display pixel is in the off state, no incident light reaches the quantum dot layer 660.

FIG. 6C schematically shows the liquid crystal lens display device of FIG. 6A, where the display pixel is in an on state. As shown in FIG. 6C, when the display pixel is in the on state, the liquid crystal molecules of the liquid crystal layer 640 are driven by the first and second transparent electrodes 642 and 644 to have a predetermined retardation to form the liquid crystal lenses. In this case, the blue light beams passing through the liquid crystal layer 640 are refracted by the liquid crystal lenses formed by the liquid crystal molecules having the predetermined retardation, such that a portion of the refracted blue light beams penetrate through one of the second openings of the second shield layer 652 and one of the first openings of the first shield layer 654 to reach the quantum dot layer 660. In other words, when the display pixel is in the on state, a portion of the blue light beams would be refracted to pass through the light shield structure 650 to reach the quantum dot layer 660.

Figure 7A:
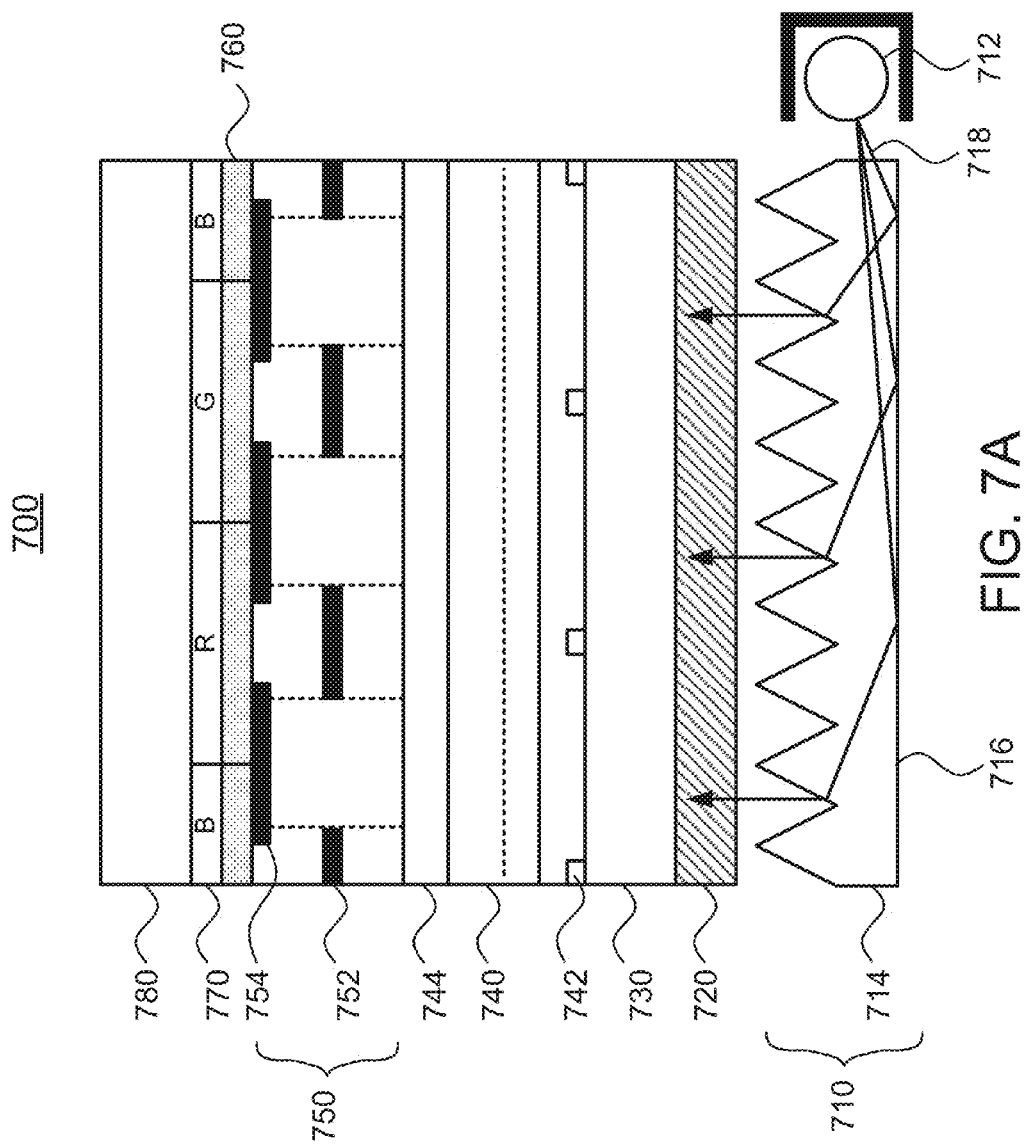
FIG. 7A schematically shows a cross-sectional view of a liquid crystal lens display device using a light shield structure and a quantum dot sheet according to a further embodiment of the disclosure.

FIG. 7A schematically shows a cross-sectional view of a liquid crystal lens display device using a light shield structure and a quantum dot sheet according to a further embodiment of the disclosure. As shown in FIG. 7A, the liquid crystal lens display device 700 includes a backlight module 710 and a liquid crystal structure. Specifically, the liquid crystal structure includes a polarizer 720, a first substrate 730, a liquid crystal layer 740, a light shield structure 750, a quantum dot layer 760, a CF layer 770, and a second substrate 780. In certain embodiments, the liquid crystal lens display device 700 may further include a plurality of first transparent electrodes 742 disposed on the first substrate 730, and a transparent common electrode (or namely a second transparent electrode) 744 disposed on a far side of the liquid crystal layer 740 from the first substrate 730, where the transparent common electrode 744 is a plate electrode. It should be noted that the layers of the liquid crystal lens display device 700 are provided solely for illustrative purposes, and the relative sizes and positions of the layers may vary. Further, although some layers are illustrated with gaps therebetween, the actual structure of the liquid crystal lens display device 700 may be positioned to have gaps or have no gaps between the layers. It should be noted that the liquid crystal lens display device 700 as shown in FIG. 7A includes almost identical structures to the liquid crystal lens display device 400 as shown in FIG. 4A, except that the first and second transparent electrodes are different. Specifically, the liquid crystal lens display device 700 as shown in FIG. 7A uses a transparent common electrode 744 to replace the second transparent electrodes 444 as shown in FIG. 4A, and the sizes and positions of the first transparent electrodes 742 are different from those of the first transparent electrodes 442 as shown in FIG. 4A. Therefore, details of the structures of the liquid crystal lens display device 700 are hereinafter omitted.

Figure 7B:
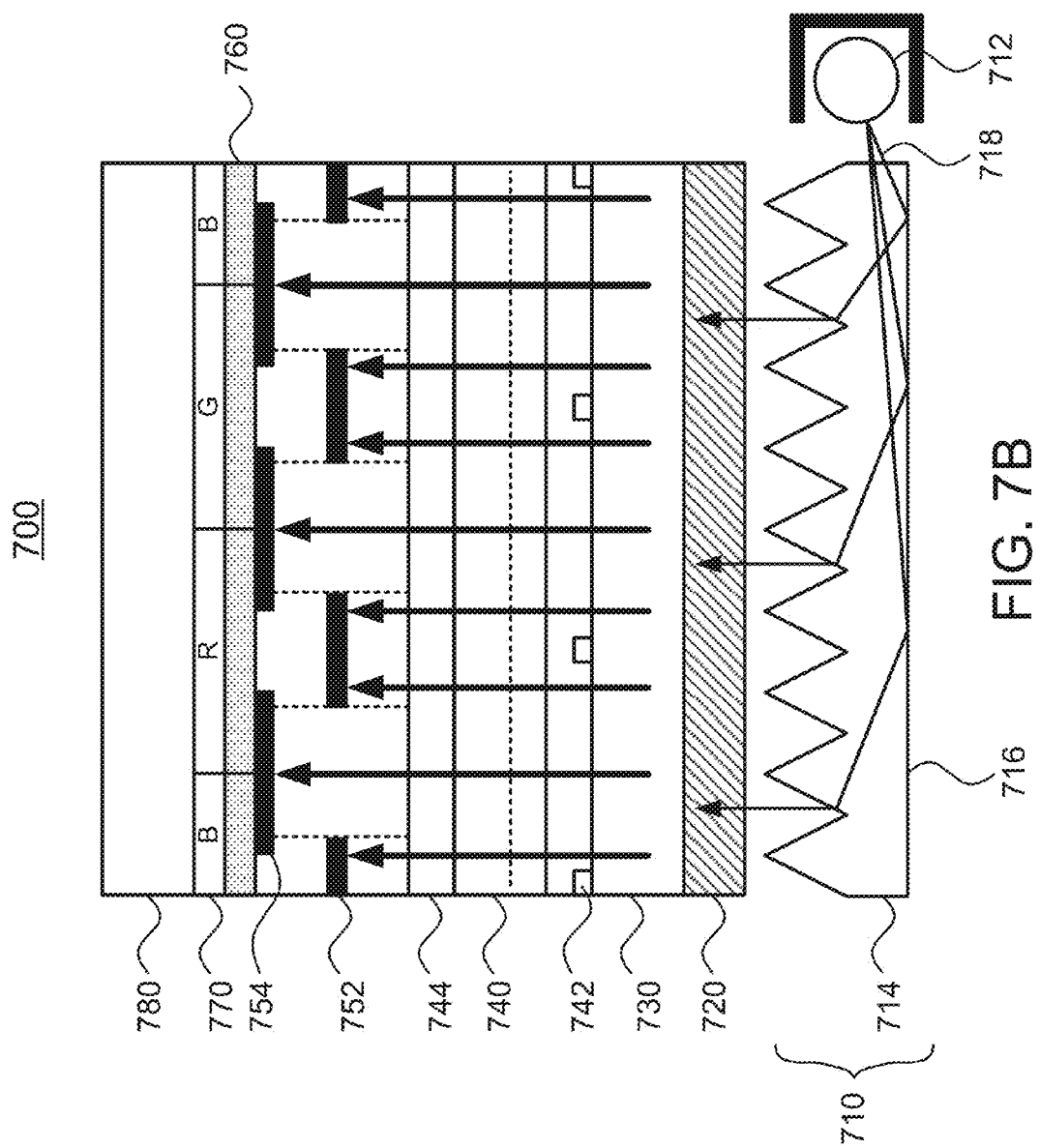
FIG. 7B schematically shows the liquid crystal lens display device of FIG. 7A, where the display pixel is in an off state.

FIG. 7B schematically shows the liquid crystal lens display device of FIG. 7A, where the display pixel is in an off state. As shown in FIG. 7B, when the display pixel is in the off state, the liquid crystal molecules of the liquid crystal layer 740 allow the blue light beams passing through the display pixel to penetrate the liquid crystal molecules along the perpendicular direction (i.e., the first direction substantially perpendicular to the liquid crystal layer 740) without being refracted. In this case, each of the blue light beams passing through the liquid crystal layer 740 is blocked by one of the first shield portions of the first shield layer 754 and by one of the second shield portions of the second shield layer 752 without reaching the quantum dot layer 760. In other words, when the display pixel is in the off state, no incident light reaches the quantum dot layer 760.

Figure 7C:
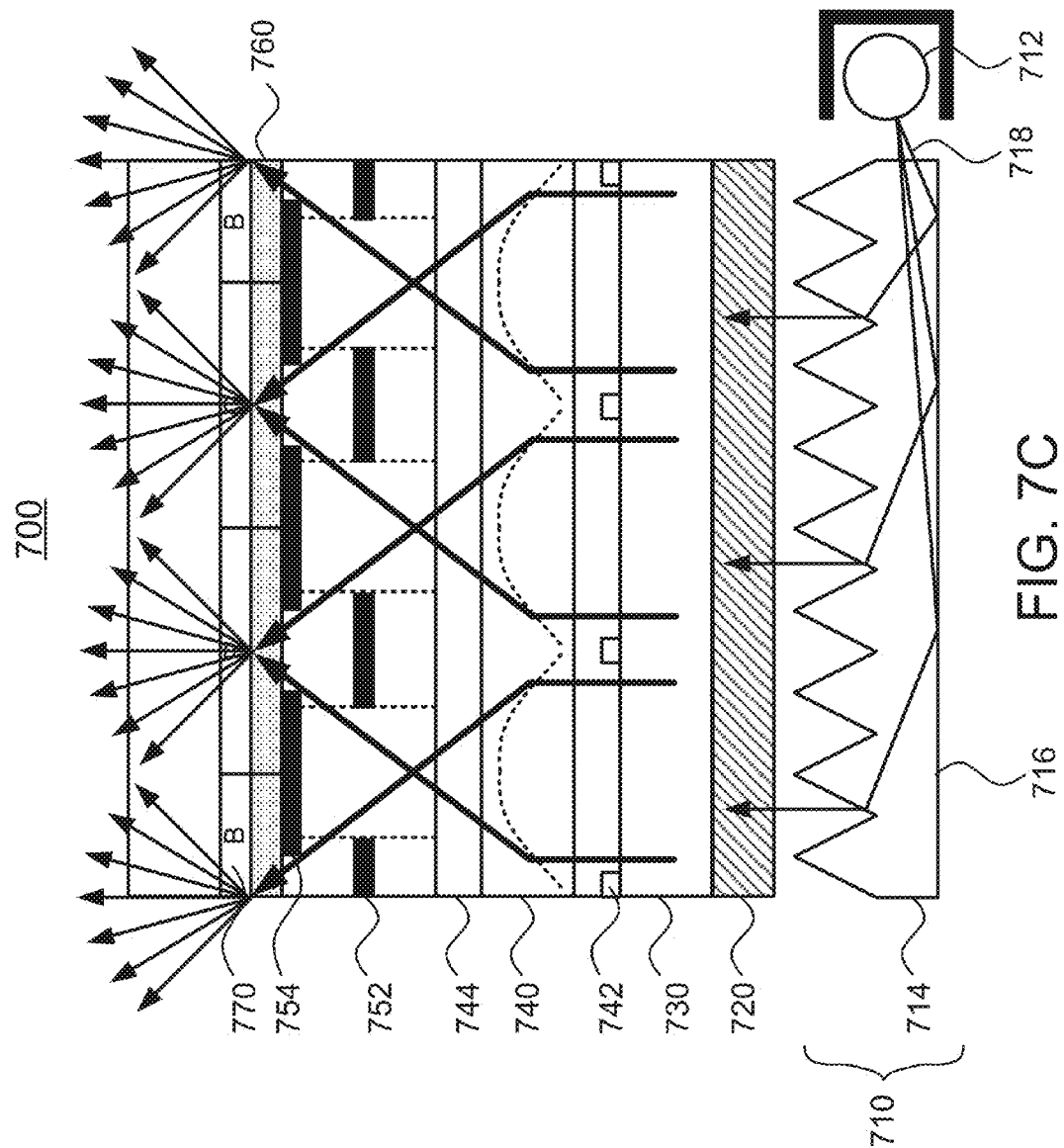
FIG. 7C schematically shows the liquid crystal lens display device of FIG. 7A, where the display pixel is in an on state.

FIG. 7C schematically shows the liquid crystal lens display device of FIG. 7A, where the display pixel is in an on state. As shown in FIG. 7C, when the display pixel is in the on state, the liquid crystal molecules of the liquid crystal layer 740 are driven by the first transparent electrodes 742 and the transparent common electrode 744 to have a predetermined retardation to form the liquid crystal lenses. In this case, the blue tight beams passing through the liquid crystal layer 740 are refracted by the liquid crystal lenses formed by the liquid crystal molecules having the predetermined retardation, such that a portion of the refracted blue light beams penetrate through one of the second openings of the second shield layer 752 and one of the first openings of the first shield layer 754 to reach the quantum dot layer 760. In other words, when the display pixel is in the on state, a portion of the blue light beams would be refracted to pass through the light shield structure 750 to reach the quantum dot layer 760.

Figure 8:
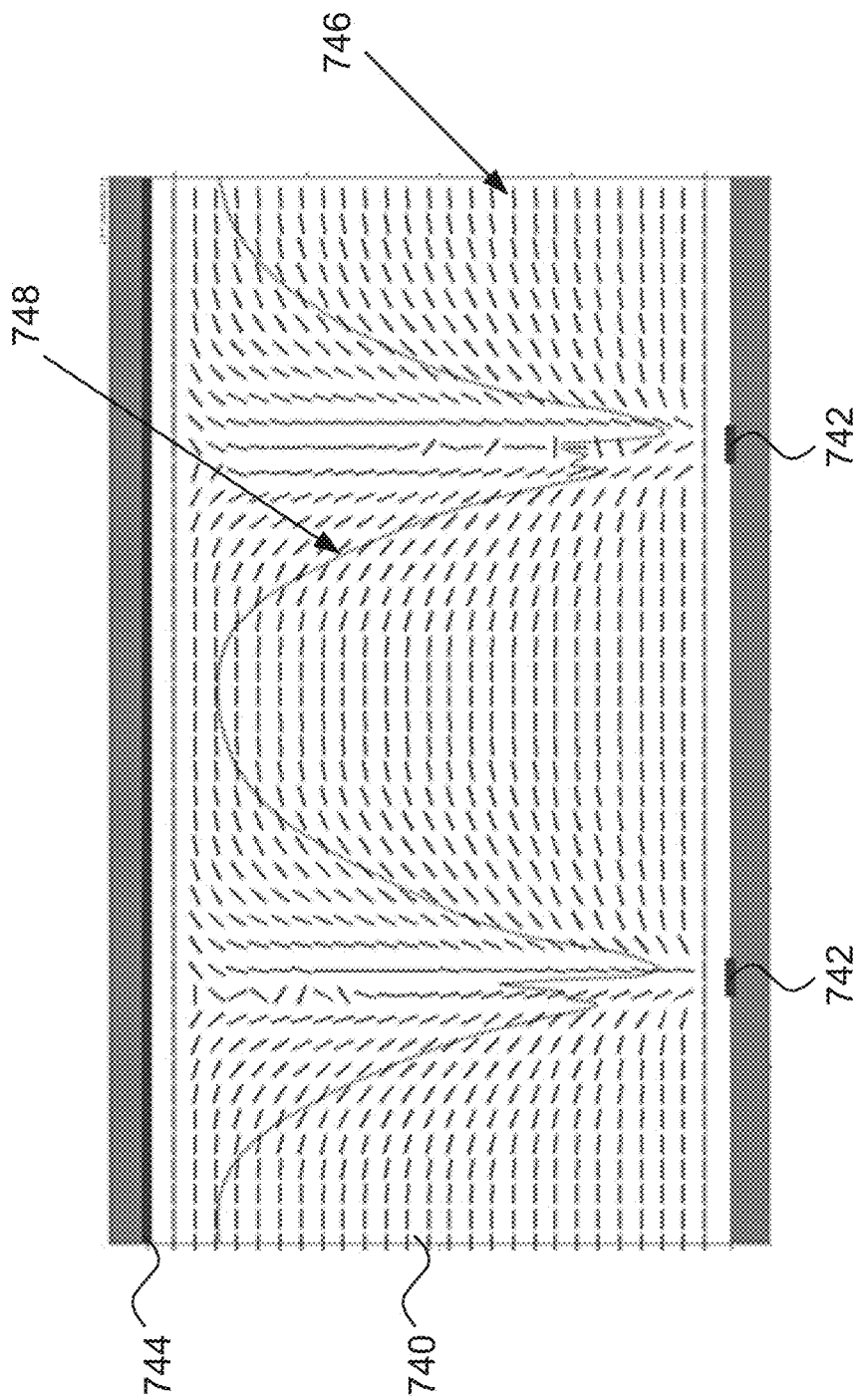
FIG. 8 schematically shows retardation of the liquid crystal molecules of the liquid crystal layer of the liquid crystal lens display device when the display pixel is in an on state according to one embodiment of the disclosure.

FIG. 8 schematically shows retardation of the liquid crystal molecules of the liquid crystal layer of the liquid crystal lens display device when the display pixel is in an on state according to one embodiment of the disclosure. As shown in FIG. 8, when a predetermined voltage difference is obtained between the first transparent electrodes 742 and the transparent common electrode 744, the liquid crystal molecules 746 of the liquid crystal layer 740 rotates due to the electric field generated by the predetermined voltage difference, thus forming the liquid crystal lens 748.

FIG. 9A schematically shows a cross-sectional view of a liquid crystal lens display device using a light shield structure and a quantum dot layer according to a further embodiment of the disclosure, where the display pixel is in an on state. As shown in FIG. 9A, the liquid crystal lens display device 900 includes a backlight module 910 and a liquid crystal structure. Specifically, the liquid crystal structure includes a polarizer 920, a first substrate 930, a liquid crystal layer 940, a light shield structure 950, a quantum dot layer 960, a CF layer 970, and a second substrate 980. In certain embodiments, the liquid crystal lens display device 900 may further include a plurality of first transparent electrodes 942 disposed on the first substrate 930, and a transparent common electrode (or namely a second transparent electrode) 944 disposed on a far side of the liquid crystal layer 940 from the first substrate 930, where the transparent common electrode 944 is a plate electrode. It should be noted that the layers of the liquid crystal lens display device 900 are provided solely for illustrative purposes, and the relative sizes and positions of the layers may vary. Further, although some layers are illustrated with gaps therebetween, the actual structure of the liquid crystal lens display device 900 may be positioned to have gaps or have no gaps between the layers. It should be noted that the liquid crystal lens display device 900 as shown in FIG. 9A includes almost identical structures to the liquid crystal lens display device 700 as shown in FIG. 7A, except that the sizes and positions of the color filters of the CF layer 970 are different, and the light shield structure 950, the retardation of the liquid crystal layer 940 and the first transparent electrodes 942 are also correspondingly different. Specifically, the liquid crystal lens display device 900 as shown in FIG. 9A has a different arrangement of the color filters from that of the liquid crystal lens display device 900 as shown in FIG. 7A. For example, a boundary exists between each of two adjacent color filters with different colors of the color filter layer 970 or the quantum dot layer 960, and the boundaries correspond to some of the first openings of the first shield layer 954 and some of the second shield portions of the second shield layer 952. Further, the other first openings of the first shield layer 954 correspond to the other second shield portions of the second shield layer 952 and the color filters with different colors of the color layer filter 970 or the quantum dot layer 960, and the first shield portions of the first shield layer 954 corresponding to the second openings of the second shield layer 952. Thus, the first transparent electrodes 942 are arranged correspondingly to change the retardation of the liquid crystal layer 940, and the first shield layer 954 and the second shield layer 952 are also arranged correspondingly to ensure that the refracted blue light beams may pass through the second openings of the second shield layer 952 and the first openings of the first shield layer 954. Therefore, details of the other structures of the liquid crystal lens display device 900 are hereinafter omitted.

As described above, each of the structures of the liquid crystal lens display device may vary based on the design and manufacturing requirements of the liquid crystal lens display device. For example, the color filter arrangements of the CF layer may be changed based on the display requirements to achieve better color display quality. In certain embodiments, each of the display pixels may include a plurality of subpixels, and each of the subpixels may correspond to one of the color filters, which represents an emitting area configured to display one of the RGB colors. In this case, the other structures of the liquid crystal lens display device, such as the light shield structure and the transparent electrodes, may also be arranged corresponding to the color filter arrangements.

Figure 9B:
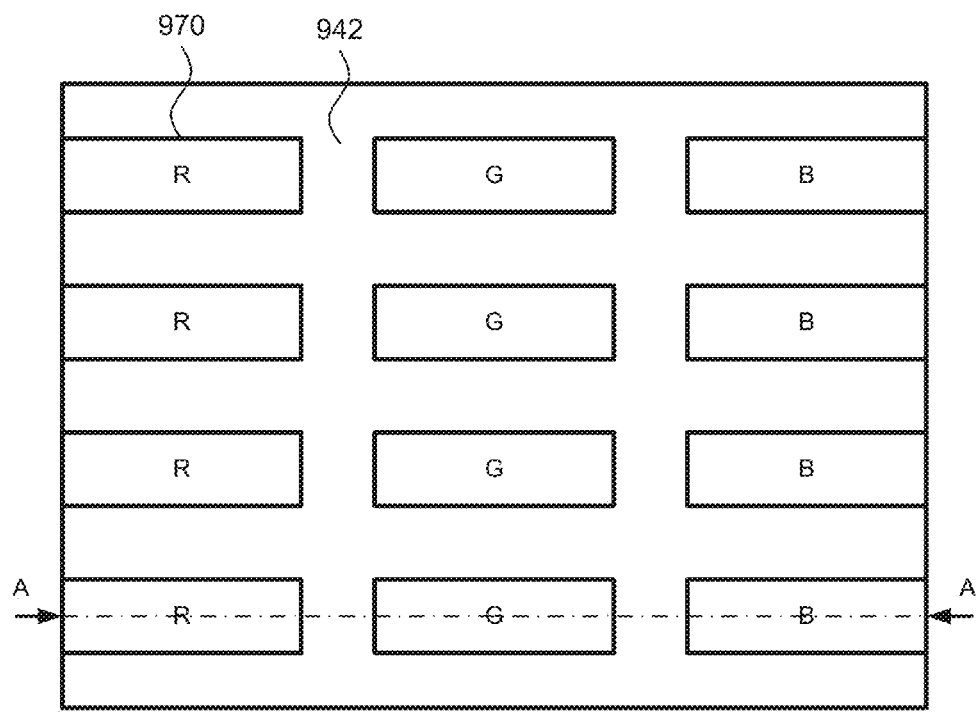
FIG. 9B schematically shows a color filter layer and transparent electrodes of a liquid crystal lens display device according to one embodiment of the disclosure.
Figure 9C:
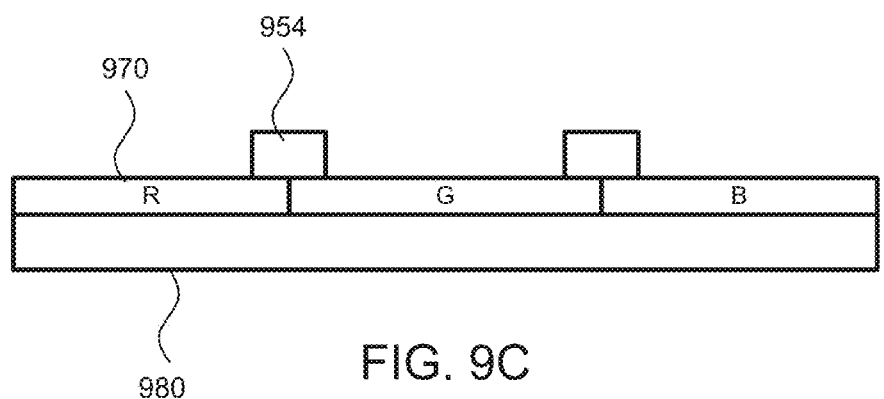
FIG. 9C schematically shows a cross-sectional view of a liquid crystal lens display device along the line A-A as shown in FIG. 9B.

FIG. 9B schematically shows a color filter layer and transparent electrodes of a liquid crystal lens display device according to one embodiment of the disclosure, and FIG. 9C schematically shows a cross-sectional view of a liquid crystal lens display device along the line A-A as shown in FIG. 9B. As shown in FIG. 9C, the color filter layer 970 is formed on the second substrate 980. As shown in FIG. 9B, the color filter layer 970 includes a plurality of color filters, and each color filter represents one of the three primary colors of RGB. In this case, the first shield portions of the first shield layer 954 may be positioned between the boundaries of the color filters of the color filter layer 970, as shown in FIG. 9B. Specifically, the reason to position the first shield portions of the first shield layer 954 between the boundaries of the color filters of the color filter layer 970 is to avoid color mixing. Color mixing occurs when the refracted blue light beam enters the wrong color filters due to refraction or deviation of the light beam over the boundaries of the color filters. For example, when a refracted light beam that is intended to enter the red color filter deviates over the boundaries of the color filters and enters the adjacent green color filter, color mixing occurs. By positioning the first shield portions of the first shield layer 954 between the boundaries of the color filters of the color filter layer 970, the refracted blue light beams from the liquid crystal lens would only enter the designated color filters, and color mixing would be thus avoided.

As described above, by using the quantum dot layer and the light shield structure, the liquid crystal lens display device may maintain high optical efficiency to achieve high brightness and high contrast, while the manufacture and assembly cost may remain low.

Figure 10B:
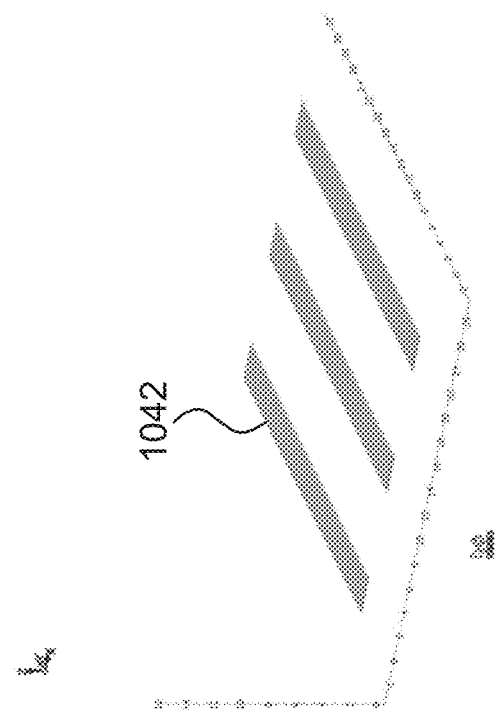
FIGS. 10A and 10B schematically show a first step of forming a liquid crystal structure according to one embodiment of the disclosure, where
Figure 10A:
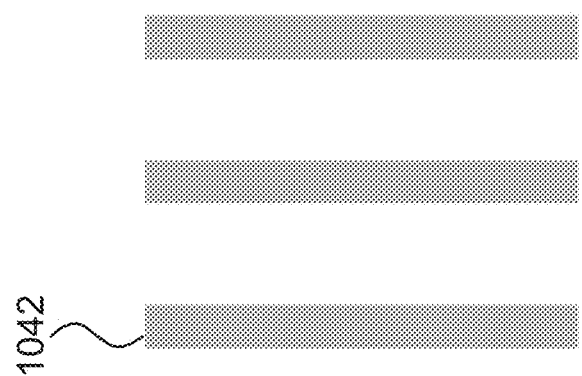
Figure 12:
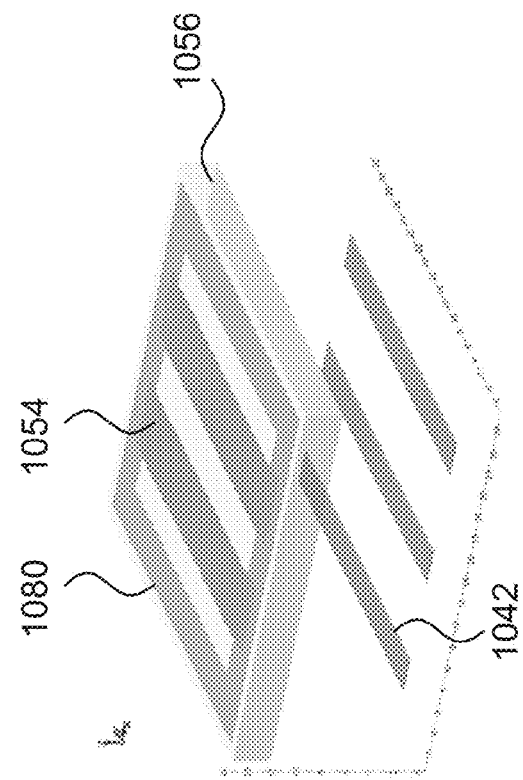
FIG. 12 schematically shows a third step of forming a liquid crystal structure according to one embodiment of the disclosure.
Figure 11:
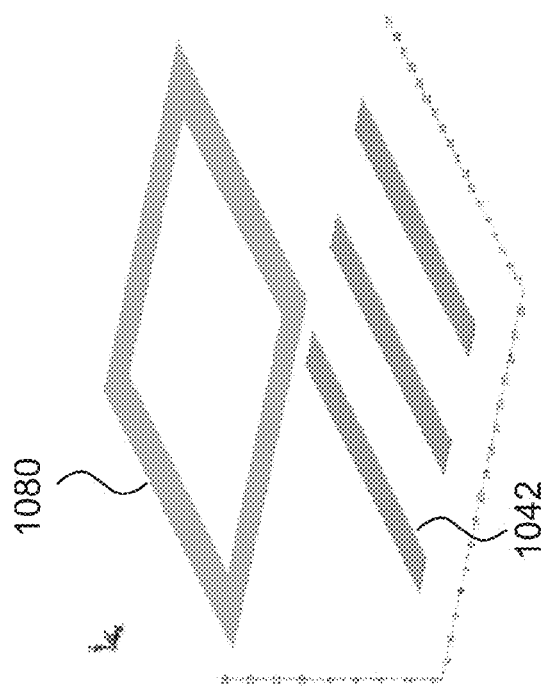
FIG. 11 schematically shows a second step of forming a liquid crystal structure according to one embodiment of the disclosure.
Figure 14:
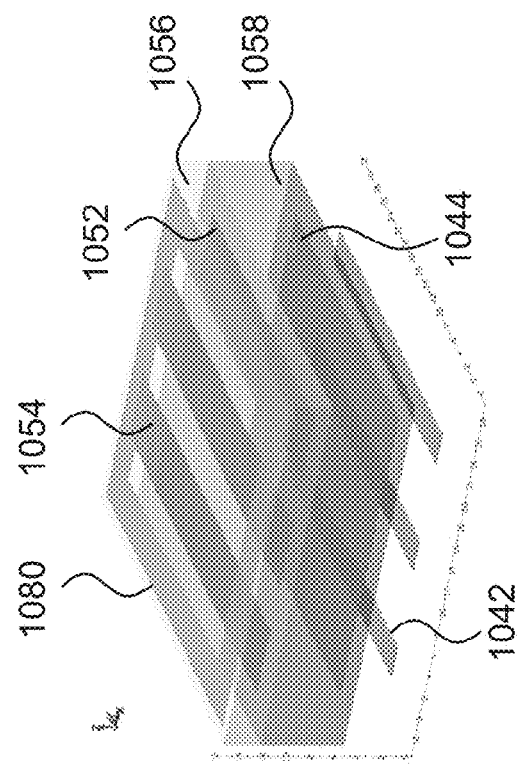
FIG. 14 schematically shows a fifth step of forming a liquid crystal structure according to one embodiment of the disclosure.
Figure 13:
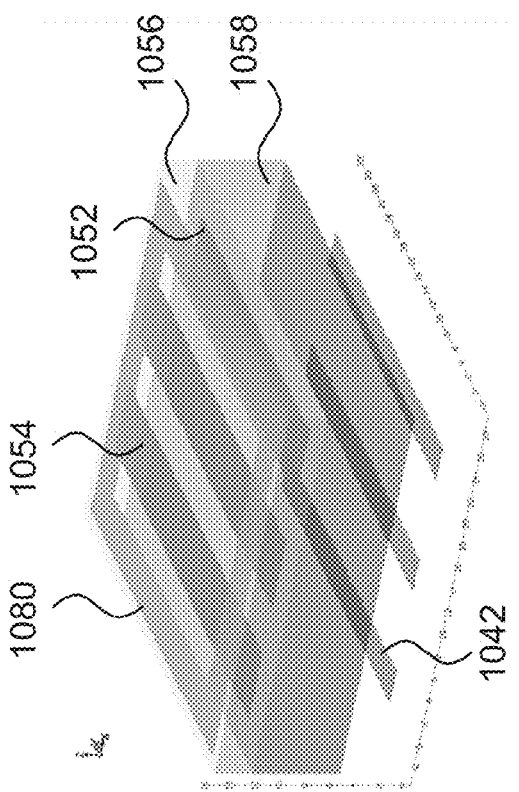
FIG. 13 schematically shows a fourth step of forming a liquid crystal structure according to one embodiment of the disclosure.
Figure 15A:
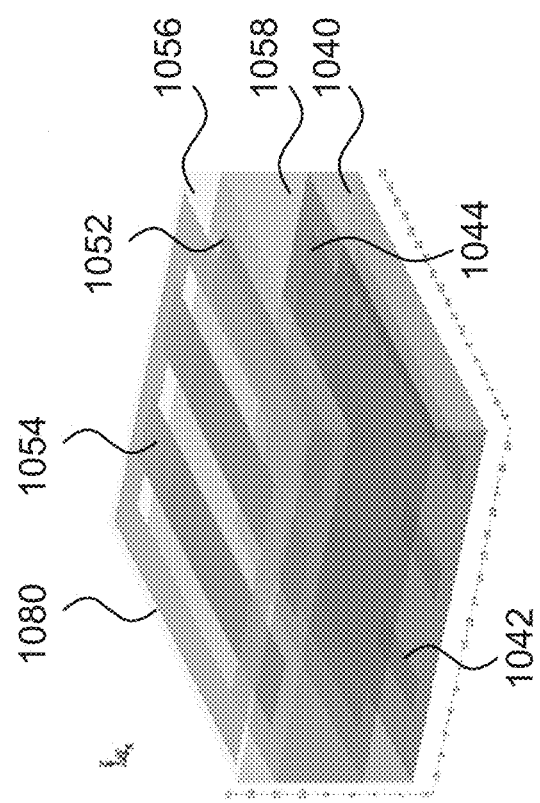
FIG. 15A schematically shows a six step of forming a liquid crystal structure according to one embodiment of the disclosure.

FIGS. 10A-15A shows a plurality of steps of forming a liquid crystal lens structure according to one embodiment of the disclosure. As shown in FIGS. 10A and 10B, a plurality of pixel electrodes 1042 is formed. In certain embodiments, the pixel electrodes 1042 are similar to the first transparent electrodes 942 on the first substrate 930 as shown in FIG. 9A, where the first transparent electrodes 942 has several slits, and each slit is disposed between two adjacent first transparent electrodes 942. As shown in FIG. 11, a black matrix (BM) layer 1080 is formed on inner surface of the second substrate 980, the BM layer 1080 is disposed at a boundary on the two adjacent display pixels. As shown in FIG. 12, a first shield layer 1054 is formed on the second substrate 980 and the BM layer 1080, where the first shield layer 1054 has a plurality of first shield portions and a plurality of first openings, the first shield portions correspond to the slits of the first transparent electrodes 942, and the first openings correspond to the first transparent electrodes 942. Further, a first transparent organic layer (or namely a first dielectric layer) 1056 is formed on the first shield layer 1054. In other words, the first dielectric layer 1056 is covered the first shield layer 1054. As shown in FIG. 13, a second shield layer 1052 is formed on the first dielectric layer 1056, where the second shield layer 1052 has a plurality of second shield portions and a plurality of second openings, and the first dielectric layer 1056 separates the first shield layer 1054 and the second shield layer 1052. The second shield portions correspond to the first openings, each second shield portion overlapped partial of two adjacent first shield portions and partial of the BM layer 1080, and the second openings correspond to the first shield portions. In certain embodiments, the first shield layer 1054 and the second shield layer 1052 form the light shield structure 1050. Further, a second transparent organic layer (or namely a second dielectric layer) 1058 is formed on the second shield layer 1052. In other words, the second dielectric layer 1058 is covered by the second shield layer 1054. In certain embodiments, the materials of the first and second dielectric layers 1056, 1058 can be organic materials as described above, inorganic materials as described above, or other suitable materials. As shown in FIG. 14, a transparent common electrode (or namely a second transparent electrode) 1044 is formed on the second dielectric layer 1058. In other words, the transparent common electrode 1044 is covered by the second dielectric layer 1058, the second shield layer 1054, the first dielectric layer 1056, the first shield layer 1054 and the BM layer 1080. In certain embodiments, the transparent common electrode 1044 is similar to the transparent common electrode 944 as shown in FIG. 7A or 9A. Moreover, as shown in FIG. 15A, a plurality of liquid crystal molecules is filled between the space of the pixel electrodes (or namely a first transparent electrode) 1042 and the transparent common electrode 1044 to form the liquid crystal layer 1040, where the transparent common electrode 1044 is a plate electrode.

Figure 15B:
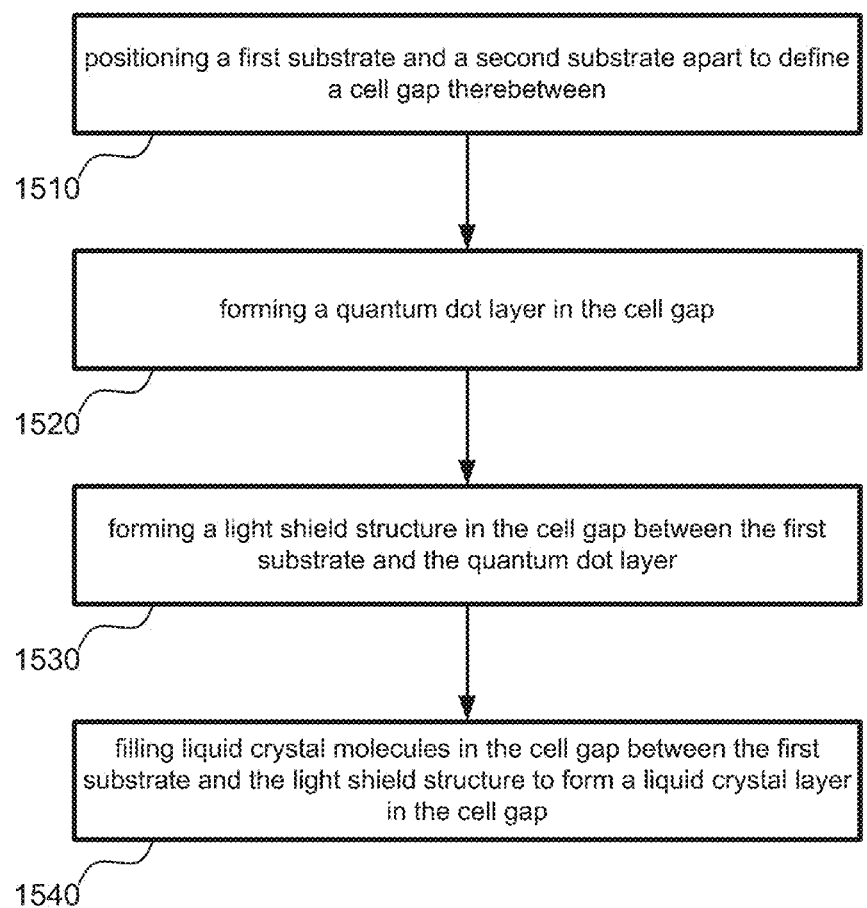
FIG. 15B shows a flowchart of the steps of forming a liquid crystal structure according to one embodiment of the disclosure.

FIG. 15B shows a flowchart of the steps of forming a liquid crystal structure according to one embodiment of the disclosure. As shown in FIG. 15B, at the step 1510, a first substrate and a second substrate are positioned apart to define a cell gap therebetween. At the step 1520, a quantum dot layer is formed in the cell gap. At the step 1530, a light shield structure is formed in the cell gap between the first substrate and the quantum dot layer. In certain embodiment, the light shield structure may include the structures of the first shield layer, the first transparent organic layer (or namely the first dielectric layer), the second shield layer and the second transparent organic layer (or namely the second dielectric layer) as described in the above-embodiments. At the step 1540, liquid crystal molecules are filled in the cell gap between the first substrate and the light shield structure to form a liquid crystal layer in the cell gap. Details of the structures and the layers have been described in the aforementioned embodiments.

In certain embodiments, optionally, the steps of forming a liquid crystal structure may further include: forming a polarizer on an opposite side of the first substrate to the cell gap; and forming a color filter (CF) layer between the quantum dot layer and the second substrate. Furthermore, the outside surface of the second substrate does not have any polarizer.

In certain embodiments, optionally, the steps of forming a liquid crystal structure may further include: forming a plurality of first transparent electrodes on the first substrate; and forming a plurality of second transparent electrodes on a far side of the liquid crystal layer from the first substrate, where each display pixel corresponds to at least one of the first transparent electrodes and at least one of the second transparent electrodes, such that the corresponding first and second transparent electrodes to each display pixel, when given a predetermined voltage difference therebetween, are configured to switch the display pixel to the on state by driving the liquid crystal molecules of the display pixel to have the predetermined retardation to form the at least one liquid crystal lens.

Figure 16:
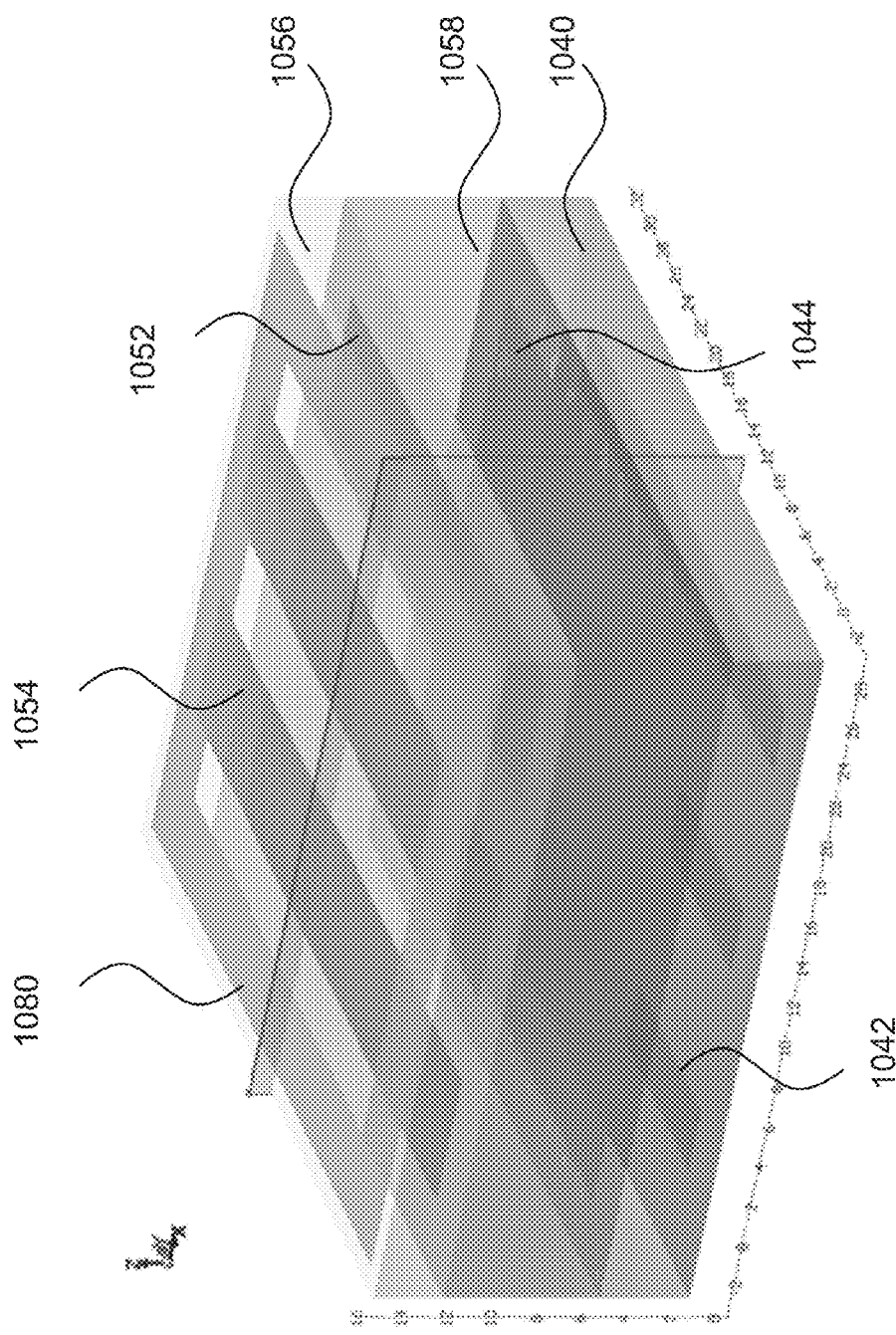
FIG. 16 schematically shows a perspective view of a liquid crystal structure formed by the steps of FIGS. 10A-15 according to one embodiment of the disclosure.
Figure 17A:
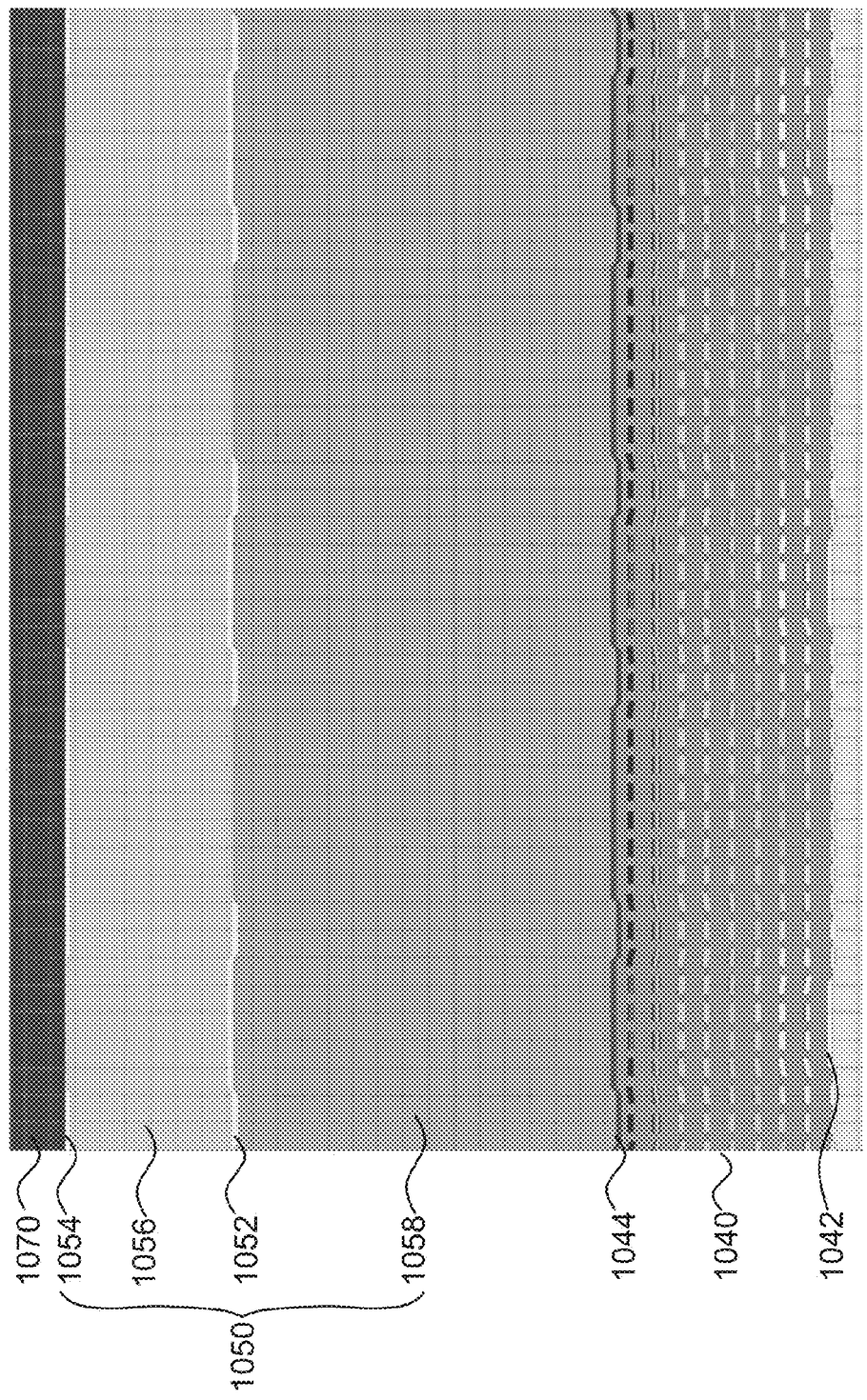
FIG. 17A schematically shows a cross-sectional view of the liquid crystal structure as shown in FIG. 16 according to one embodiment of the disclosure, where the liquid crystal layer is in an off state.

FIG. 16 schematically shows a liquid crystal structure formed by the steps of FIGS. 10A-15 according to one embodiment of the disclosure. FIGS. 17A and 17B schematically show the cross-sectional view of the liquid crystal structure as shown in FIG. 16, where FIG. 17A shows that the liquid crystal layer is in an off state, and FIG. 17B shows that the liquid crystal layer is in an on state. In this embodiment, the driving voltage of the pixel electrodes 1042 is about 5V. In certain embodiments, the quantum dot layer 1070, the light shield structure 1050 having the first shield layer 1054 and the second shield layer 1052, the first dielectric layer 1056, the second dielectric layer 1058, the second transparent electrode 1044, the liquid crystal layer 1040, and the first transparent electrodes may be similar to those as described in the above-embodiments, such as FIGS. 10A-15.

As shown in the embodiments of the liquid crystal lens display device as described above, each of the liquid crystal lenses formed by the liquid crystal layer is a convex lens. A key factor of the display quality is the focal length F of the liquid crystal lens. In certain embodiments, the focal length F of the liquid crystal lens may be obtained by calculation using the extraordinary refractive index ($n_e$) of the liquid crystals. In certain embodiments, the gradient index (GRIN) and the focal length F of the liquid crystal lens may be determined by the following equations:

$$n(r) \approx n_{max}\left(1 - \frac{1}{2}\alpha^2 r^2\right) \quad (1)$$

$$F = \frac{1}{\alpha \cdot n_{max} \sin \alpha d} \quad (2)$$

where r is the radius curvature of the liquid crystal lens, n is the GRIN, $n_{max}$ is the maximum value of $n_e$, d is the distance of the cell gap, and α is a constant. Thus, n(r) is the refractive index of the liquid crystals at r. In certain embodiments, the radius curvature r of the liquid crystal lens may be in a range of about 2-6 um, the distance d of the cell gap may be in a range of about 3-5 um, $n_{max}$ may be in a range of about 1.6-1.8, and α may be in a range of about 0.15-0.25 (no unit). In one embodiment, the radius curvature r may be in a range of about 3.5-4.1 um, the distance d of the cell gap may be about 4 um, $n_{max}$ may be about 1.6965, and α may be about 0.2.

Figure 18B:
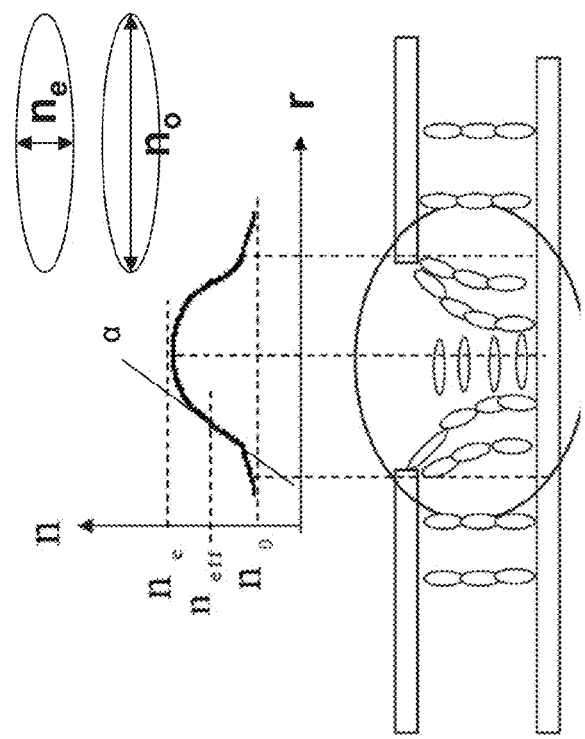
FIGS. 18A and 18B schematically show the refractive index of the liquid crystal layer according to certain embodiments of the disclosure, where
Figure 18A:
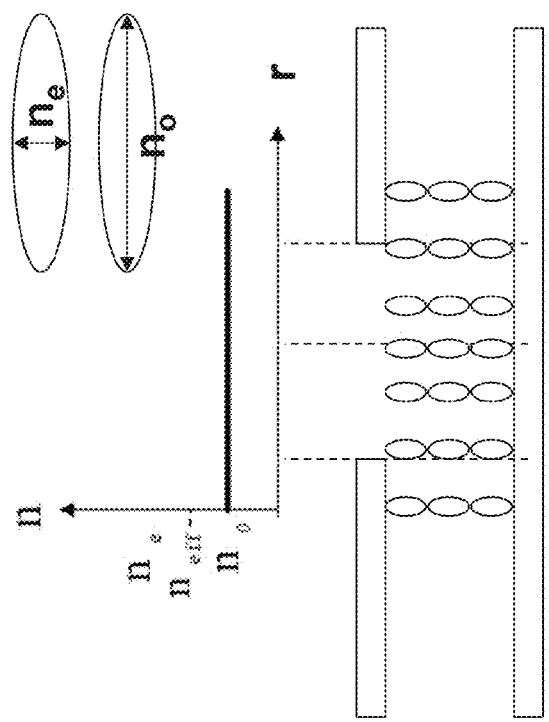

FIGS. 18A and 18B schematically show the refractive index of the liquid crystal layer according to certain embodiments of the disclosure, where FIG. 18A shows that the liquid crystal layer is in an off state, and FIG. 18B shows that the liquid crystal layer is in an on state. As shown in FIG. 18A, when the liquid crystal layer is in the off state, all liquid crystal molecules have the ordinary refractive index ($n_o$). As shown in FIG. 18B, when the liquid crystal layer is switched to the on state, some of the liquid crystal molecules may change their orientations to have the extraordinary refractive index ($n_e$), thus forming the liquid crystal lens. In certain embodiments, the constant α may be obtained from the refractive index diagram as shown in FIG. 18B. In certain embodiments, $n_o$ may be about 1.4871, and $n_e$ may be about 1.6965.

Figure 18D:
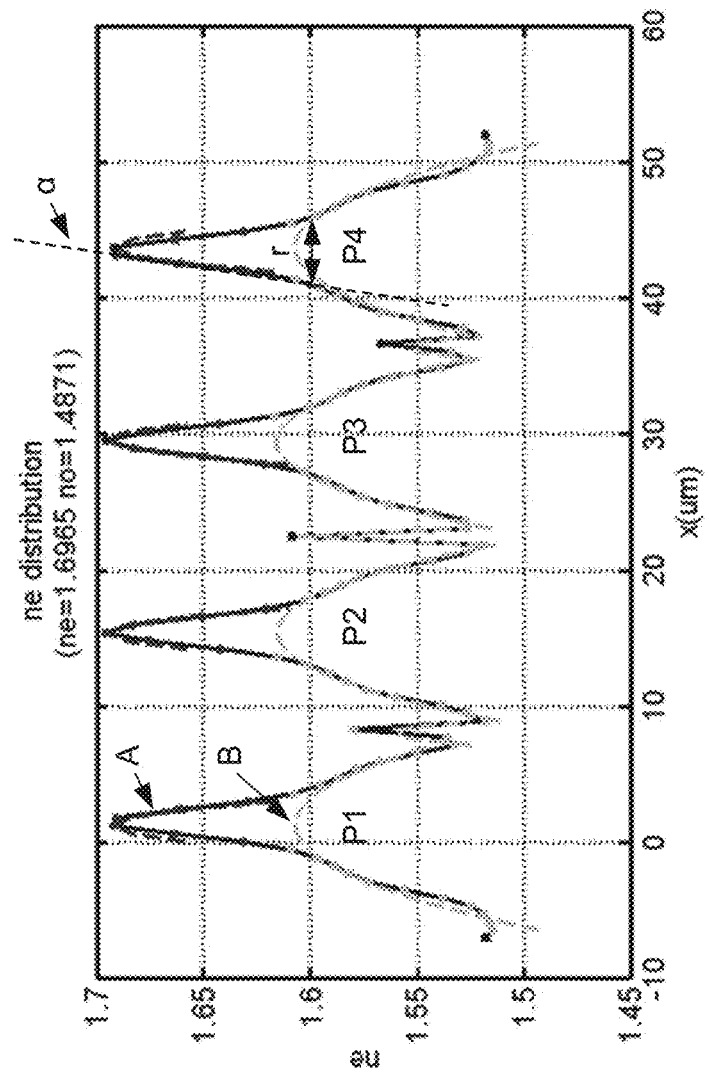
FIG. 18D shows the x–ne relationship of the ne calculation according to one embodiment of the disclosure.

FIG. 18C shows simulated liquid crystal molecule orientation for $n_e$ calculation of the focal length F of the liquid crystal lens according to one embodiment of the disclosure. FIG. 18D shows the x-$n_e$ relationship of the ne calculation according to one embodiment of the disclosure. The simulated liquid crystal molecule orientation as shown in FIG. 18A is obtained using 2 dimmos for ne calculation. As shown in FIG. 18D, data at four specific positions (P1, P2, P3 and P4) are obtained using the values $n_o$=1.4871 and $n_e$=1.6965. Based on the $n_e$ calculation, the following results may be obtained:

TABLE 1

Determination of GRIN lens diameter calculation

| | Position | | P1 | P2 | P3 | P4 |
|---|---|---|---|---|---|---|
| x range (um) | Up (A) | Max | 3.62 | 17.19 | 31.35 | 45.51 |
| | | Min | −0.51 | 13.65 | 27.81 | 41.38 |
| | | Max-Min (GRIN lens diameter) | 4.13 | 3.54 | 3.54 | 4.13 |
| | Down (B) | Max | 7.16 | 21.91 | 35.48 | 51.41 |
| | | Min | −6.41 | 8.93 | 23.09 | 37.25 |
| | | Max-Min (GRIN lens diameter) | 13.57 | 12.98 | 12.39 | 14.16 |

TABLE 2

Determination of focal length F

| Position | | F (um) |
|---|---|---|
| Up (A) | P1 | 12.99 |
| | P2 | 11.24 |
| | P3 | 11.03 |
| | P4 | 13.12 |
| Down (B) | P1 | 44.04 |
| | P2 | 35.58 |
| | P3 | 34.81 |
| | P4 | 44 |

Based on the calculation, a focal length F of about 11 um may be desired. Once the focal length F of the liquid crystal length is determined, the positions of the first shield layer and the second shield layer of the light shield structure may be determined accordingly. In certain embodiments, the second shield layer may be positioned apart from the liquid crystal layer such that a distance between the liquid crystal lens and the second openings of the second shield layer is about the focus length F. In other words, the second openings are located near the focus of the liquid crystal lens.

In certain embodiments, the first shield layer and the second shield layer are positioned such that, for each display pixel of the liquid crystal layer, when the display pixel is in the on state, a portion of the blue light beams are refracted by the at least one liquid crystal lens to penetrate through one of the second openings, and then be reflected between the first shield portions of the first shield layer and the second shield portions of the second shield layer, before penetrating through one of the first openings to reach the quantum dot layer.

Figure 19:
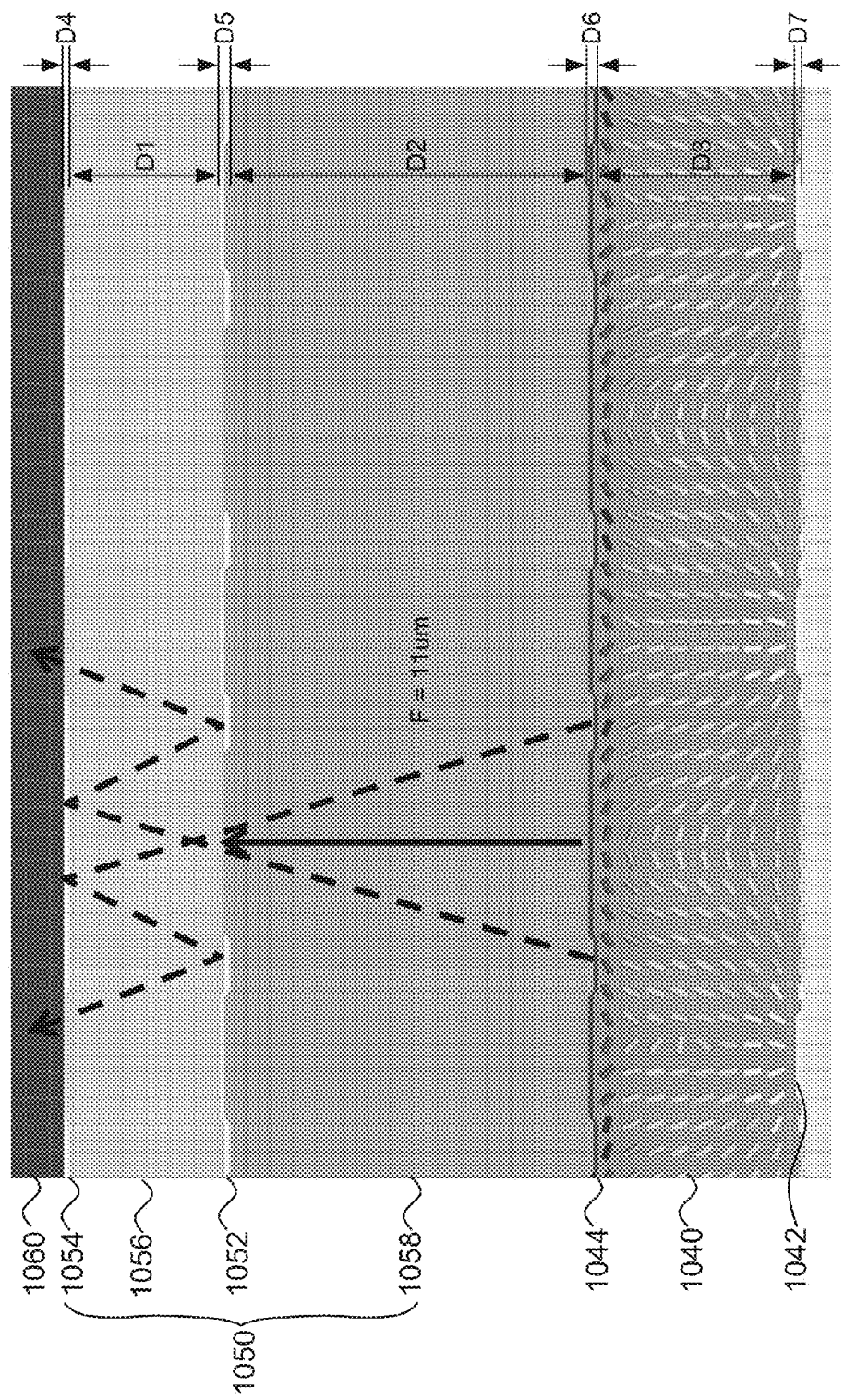
FIG. 19 schematically shows a light shield structure according to one embodiment of the disclosure, where the refracted light is reflected between the first shield portions of the first shield layer and the second shield portions of the second shield layer.

FIG. 19 schematically shows a light shield structure according to one embodiment of the disclosure, where the refracted light is reflected between the first shield portions of the first shield layer and the second shield portions of the second shield layer. As shown in FIG. 19, when the refracted blue light beams passes through the second openings of the second shield layer 1052, the refracted blue light beams are reflected between the first shield portions of the first shield layer 1054 and the second shield portions of the second shield layer 1052, before penetrating through the first openings of the first shield layer 1054 to reach the quantum dot layer 1070. In this case, at least a portion of the first shield portions of the first shield layer 1054 and the second shield portions of the second shield layer 1052 may be reflective (reflective materials) such that the refracted blue light beams are reflected therebetween without reducing the optical efficiency. In certain embodiments, the dimensions of the light shield structures are determined based on the focal length F of the liquid crystal layer. For example, as shown in FIG. 19, when the focal length F is about 11 um, the thickness D1 of the first dielectric layer 1056 may be in a range of about 2-4 um, the thickness D2 of the second dielectric layer 1058 may be in a range of about 9-13 um, the thickness D3 of the liquid crystal layer 1040 may be in a range of about 3-5 um, the thickness D4 of the first shield layer 1054 may be in a range of about 0.1-1.0 um, the thickness D5 of the second shield layer 1052 may be in a range of about 0.1-1.0 um, the thickness D6 of the transparent common electrode 1044 (or namely the second transparent electrode) may be in a range of about 0.05-0.5 um and the transparent common electrode 1044 is a plate electrode, and the thickness D7 of the pixel electrodes (or namely the first transparent electrodes) 1042 may be in a range of about 0.05-0.5 um. In one embodiment, D1 is about 3 um, D2 is about 11 um, D3 is about 4 um, D4 and D5 are about 0.3 um, and D6 and D7 are about 0.1 um.

In certain embodiments, the first shield layer and the second shield layer are positioned such that, for each display pixel of the liquid crystal layer, when the display pixel is in the on state, a portion of the blue light beams are refracted by the at least one liquid crystal lens to directly penetrate through one of the second openings and one of the first openings to reach the quantum dot layer.

Figure 20:
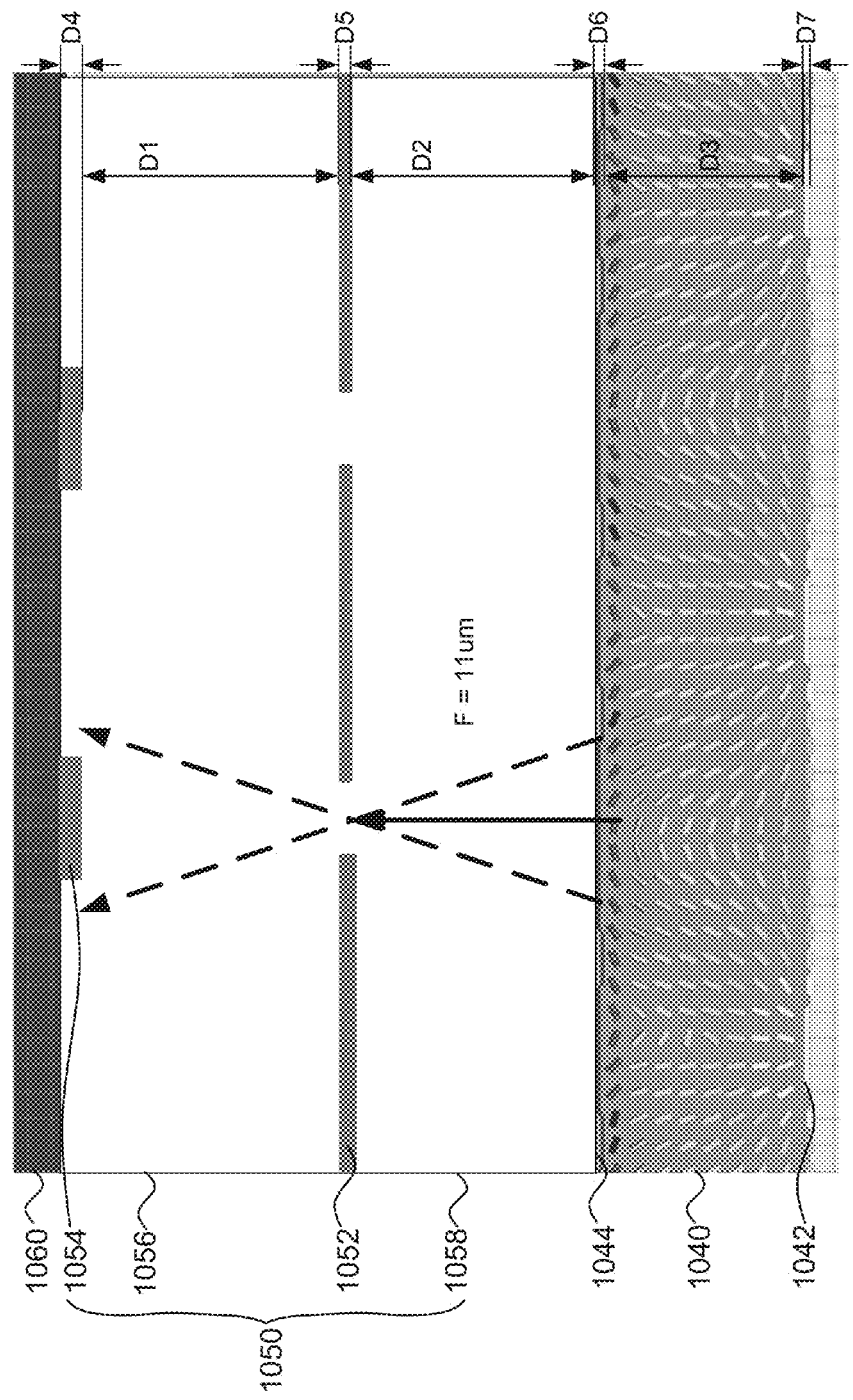
FIG. 20 schematically shows a light shield structure according to one embodiment of the disclosure, where the refracted light directly penetrates the second opening and the first opening to reach the quantum dot layer.

FIG. 20 schematically shows a light shield structure according to one embodiment of the disclosure, where the refracted light directly penetrates the second opening and the first opening to reach the quantum dot layer. As shown in FIG. 20, the refracted blue light beams directly penetrate through the second openings of the second shield layer 1052 and the first openings of the first shield layer 1054 to reach the quantum dot layer 1060 without being reflected between the first shield layer 1054 and the second shield layer 1052. In certain embodiments, the second shield portions of the second shield layer 1052 and the first shield portions of the first shield layer 1054 may be light shield (light shield materials) or light absorptive (light absorptive materials), as described in the above-embodiments about the light shield such as FIGS. 4, 6, 7 and 9. In certain embodiments, the dimensions of the light shield structures are determined based on the focal length F of the liquid crystal layer. For example, as shown in FIG. 20, when the focal length F is about 11 um, the thickness D1 of the first dielectric layer 1056 may be in a range of about 9-13 um, the thickness D2 of the second dielectric layer 1058 may be in a range of about 9-13 um, the thickness D3 of the liquid crystal layer 1040 may be in a range of about 3-5 um, the thickness D4 of the first shield layer 1054 may be in a range of about 0.1-1.0 um, the thickness D5 of the second shield layer 1052 may be in a range of about 0.1-1.0 um, the thickness D6 of the transparent common electrodes (or namely the second transparent electrodes) 1044 may be in a range of about 0.05-0.5 um, and the thickness D7 of the pixel electrodes or namely the first transparent electrodes) 1042 may be in a range of about 0.05-0.5 um. In one embodiment, D1 is about 11 um, 02 is about 11 um, D3 is about 4 um, D4 and D5 are about 0.3 um, and D6 and D7 are about 0.1 um.

In certain embodiments, the liquid crystal structure and the liquid crystal lens display device as described above may be implemented in any of the display apparatuses. For example, the liquid crystal lens display device may be a color display apparatus, a black-and-white display apparatus, or a gray level display apparatus.

In sum, aspects of the disclosure, among other things, recite a liquid crystal lens display device, which includes a liquid crystal structure. The liquid crystal structure includes a liquid crystal layer, a light shield structure, and a quantum dot layer. The liquid crystal layer defines a plurality of display pixels, where each of the display pixels of the liquid crystal layer is configured to be switchable between an on state and an off state. The light shield structure is positioned between the liquid crystal layer and the quantum dot layer, where the light shield structure includes (i) a first shield layer positioned apart from the liquid crystal layer, and (ii) a second shield layer positioned between and apart from the first shield layer and the liquid crystal layer. The first shield layer has a plurality of first openings and a plurality of first shield portions, and the second shield layer has a plurality of second openings and a plurality of second shield portions, such that each display pixel of the liquid crystal layer corresponds to at least one of the second openings, and along the first direction substantially perpendicular to the liquid crystal layer, each of the second openings corresponds to one of the first shield portions, and each of the second openings is narrower than the corresponding one of the first shield portions. For each display pixel of the liquid crystal layer, when the display pixel is in the on state, the liquid crystal molecules of the display pixel are driven to have a predetermined retardation to form at least one liquid crystal lens, such that the blue light beams passing through the display pixel are refracted by the at least one liquid crystal lens to penetrate through one of the second openings and one of the first openings to reach the quantum dot layer; when the display pixel is in the off state, the liquid crystal molecules of the display pixel allow the blue light beams passing through the display pixel to penetrate the liquid crystal molecules along the first direction without being refracted, such that each of the blue light beams is blocked by the first shield portions of the first shield layer or the second shield portions of the second shield layer without reaching the quantum dot layer.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A liquid crystal lens display device, comprising:
   (a) a first substrate and a second substrate positioned apart to define a cell gap therebetween;
   (b) a liquid crystal layer formed by liquid crystal molecules and positioned in the cell gap, defining a plurality of display pixels, wherein each of the display pixels of the liquid crystal layer is configured to be switchable between an on state and an off state;
   (c) a quantum dot layer disposed on the second substrate;
   (d) a backlight module disposed at an opposite side to the cell gap, configured to emit a bunch of light beams towards the first substrate to enter the liquid crystal layer; and (e) a light shield structure, disposed on the second substrate, and disposed between the liquid crystal layer and the quantum dot layer, wherein the light shield structure comprises:
  (i) a first shield layer positioned apart from the liquid crystal layer, wherein the first shield layer has a plurality of first openings and a plurality of first shield portions; and
  (ii) a second shield layer disposed between the first shield layer and the liquid crystal layer, wherein the second shield layer has a plurality of second openings and a plurality of second shield portions such that each display pixel of the liquid crystal layer corresponds to at least one of the second openings, and wherein each of the second openings corresponds to one of the first shield portions.

2. The liquid crystal lens display device of claim 1, wherein the first shield layer and the second shield layer are positioned such that, for each display pixel of the liquid crystal layer, when the display pixel is in the on state and the liquid crystal molecules of the display pixel are driven to have a predetermined retardation to form at least one liquid crystal lens, a portion of the light beams are refracted by the at least one liquid crystal lens to directly penetrate through one of the second openings and two of the first openings to reach the quantum dot layer.

3. The liquid crystal lens display device of claim 2, wherein each of the at least one liquid crystal lens is a convex lens having a focal length F.

4. The liquid crystal lens display device of claim 3, wherein the focal length F is about 11 um.

5. The liquid crystal lens display device of claim 3, wherein the second shield layer is positioned apart from the liquid crystal layer such that a distance between the at least one liquid crystal lens and the second openings of the second shield layer is about the focal length F.

6. The liquid crystal lens display device of claim 1, wherein the first shield layer and the second shield layer are positioned such that, for each display pixel of the liquid crystal layer, when the display pixel is in the on state and the liquid crystal molecules of the display pixel are driven to have a predetermined retardation to form at least one liquid crystal lens, a portion of the light beams are refracted by the respective liquid crystal lens to penetrate through one of the second openings, and then be reflected between one of the first shield portions of the first shield layer and two respective adjacent second shield portions of the second shield layer, before penetrating through respective two of the first openings on both sides of the one of the first shield portions to reach the quantum dot layer.

7. The liquid crystal lens display device of claim 1, further comprising:
  a color filter layer disposed between the quantum dot layer and the second substrate.

8. The liquid crystal lens display device of claim 1, further comprising:
  a plurality of first transparent electrodes disposed on the first substrate; and
  a plurality of second transparent electrodes disposed on the second substrate;
  wherein each display pixel corresponds to at least one of the first transparent electrodes and at least one of the second transparent electrodes.

9. The liquid crystal lens display device of claim 8, wherein the corresponding first and second transparent electrodes to each display pixel, when given a predetermined voltage difference therebetween, are configured to switch the display pixel to the on state by driving the liquid crystal molecules of the display pixel to have a predetermined retardation to form at least one liquid crystal lens.

10. The liquid crystal lens display device of claim 1, wherein the backlight module comprises:
  a blue or UV light source configured to emit the blue or UV light beams.

11. The liquid crystal lens display device of claim 10, wherein the backlight module comprises:
  a light guide structure configured to guide the light beams towards the first substrate; and
  a reflection sheet disposed on an outer surface of the light guide structure, configured to reflect the light beams within the light guide structure.

12. The liquid crystal lens display device of claim 1, further comprising:
  a polarizer disposed on an outer side of the first substrate opposite to the cell gap.

13. The liquid crystal lens display device of claim 1, wherein each of the second openings is narrower than the corresponding one of the first shield portions.

14. The liquid crystal lens display device of claim 1, wherein the quantum dot layer is disposed on inner surface of the second substrate and between the liquid crystal layer and the second substrate.

15. A liquid crystal structure for a liquid crystal display device, the liquid crystal structure comprising:
  (a) a first substrate and a second substrate positioned apart each other;
  (b) a liquid crystal layer formed by liquid crystal molecules and disposed between the first substrate and the second substrate, defining a plurality of display pixels, wherein each of the display pixels of the liquid crystal layer is configured to be switchable between an on state and an off state;
  (c) a quantum dot layer disposed on the second substrate; and
  (d) a light shield structure, disposed on the second substrate, and the light shield structure and the quantum dot layer stacked with each other, wherein the light shield structure comprises:
    (i) a first shield layer disposed on the second substrate, wherein the first shield layer has a plurality of first openings and a plurality of first shield portions; and
    (ii) a second shield layer disposed between the second substrate and the liquid crystal layer, wherein the second shield layer has a plurality of second openings and a plurality of second shield portions such that each display pixel of the liquid crystal layer corresponds to at least one of the second openings;
  wherein a bunch of light beams is configured to be emitted towards the liquid crystal structure to enter the liquid crystal structure.

16. The liquid crystal structure of claim 15, wherein the first shield layer and the second shield layer are positioned such that, for each display pixel of the liquid crystal layer, when the display pixel is in the on state and the liquid crystal molecules of the display pixel are driven to have a predetermined retardation to form at least one liquid crystal lens, a portion of the light beams are refracted by the at least one liquid crystal lens to directly penetrate through one of the second openings and two of the first openings to reach the quantum dot layer.

17. The liquid crystal structure of claim 16, wherein each of the at least one liquid crystal lens is a convex lens having a focal length F, and wherein the second shield layer is positioned apart from the liquid crystal layer such that a distance between the at least one liquid crystal lens and the second openings of the second shield layer is about the focal length F.

18. The liquid crystal structure of claim 17, wherein the focal length F is about 11 um.

19. The liquid crystal structure of claim 15, wherein the first shield layer and the second shield layer are positioned such that, for each display pixel of the liquid crystal layer, when the display pixel is in the on state and the liquid crystal molecules of the display pixel are driven to have a predetermined retardation to form at least one liquid crystal lens, a portion of the light beams are refracted by the respective liquid crystal lens to penetrate through one of the second openings, and then be reflected between one of the first shield portions of the first shield layer and two respective adjacent second shield portions of the second shield layer, before penetrating through respective two of the first openings on both sides of the one of the first shield portions to reach the quantum dot layer.

20. The liquid crystal structure of claim 15, further comprising:
 a polarizer disposed on an outer side of the first substrate opposite to the liquid crystal layer.

21. The liquid crystal structure of claim 15, further comprising:
 a plurality of first transparent electrodes disposed on the first substrate; and
 a plurality of second transparent electrodes disposed on the second substrate;
 wherein each display pixel corresponds to at least one of the first transparent electrodes and at least one of the second transparent electrodes.

22. The liquid crystal structure of claim 21, wherein the corresponding first and second transparent electrodes to each display pixel, when given a predetermined voltage difference therebetween, are configured to switch the display pixel to the on state by driving the liquid crystal molecules of the display pixel to have a predetermined retardation to form at least one liquid crystal lens.

23. The liquid crystal structure of claim 15, further comprising:
 a color filter layer and the quantum dot layer stacked with each other.

24. The liquid crystal structure of claim 15, wherein along a direction substantially perpendicular to the liquid crystal layer, each of the second openings corresponds to one of the first shield portions.

25. The liquid crystal structure of claim 15, wherein each of the second openings is narrower than the corresponding one of the first shield portions.

26. The liquid crystal structure of claim 15, wherein the quantum dot layer is disposed on inner surface of the second substrate, and between the liquid crystal layer and the second substrate.

27. A method of forming a liquid crystal structure for a liquid crystal display device, comprising:
 (a) positioning a first substrate and a second substrate apart each other;
 (b) forming a quantum dot layer on the second substrate;
 (c) forming a light shield structure on the second substrate, and the light shield structure and the quantum dot layer stacked with each other, wherein the light shield structure comprises:
  (i) a first shield layer having a plurality of first openings and a plurality of first shield portions; and
  (ii) a second shield layer positioned apart from the first shield layer, wherein the second shield layer has a plurality of second openings and a plurality of second shield portions; and
 (d) filling liquid crystal molecules in between the first substrate and the light shield structure to form a liquid crystal layer, wherein the liquid crystal layer defines a plurality of display pixels, each display pixel corresponding to at least one of the second openings, and wherein each of the plurality of display pixels is configured to be switchable between an on state and an off state;
  wherein the liquid crystal layer is positioned apart from the first shield layer and the second shield layer, and wherein each of the second openings corresponds to one of the first shield portions; and
  wherein a bunch of blue light beams is configured to be emitted towards the liquid crystal structure to enter the liquid crystal structure.

28. The method of claim 27, further comprising:
 forming a polarizer on an outer side of the first substrate opposite to the liquid crystal layer.

29. The method of claim 27, further comprising:
 forming a plurality of first transparent electrodes on the first substrate; and
 forming a plurality of second transparent electrodes on the second substrate;
 wherein each display pixel corresponds to at least one of the first transparent electrodes and at least one of the second transparent electrodes.

30. The method of claim 29, wherein the corresponding first and second transparent electrodes to each display pixel, when given a predetermined voltage difference therebetween, are configured to switch the display pixel to the on state by driving the liquid crystal molecules of the display pixel to have a predetermined retardation to form at least one liquid crystal lens.

31. The method of claim 27, wherein when the display pixel is in the on state and the liquid crystal molecules of the display pixel are driven to have a predetermined retardation to form at least one liquid crystal lens, each of the at least one liquid crystal lens is a convex lens having a focal length F, and wherein the second shield layer is positioned apart from the liquid crystal layer such that a distance between the at least one liquid crystal lens and the second openings of the second shield layer is about the focal length F.

32. The method of claim 27, wherein each of the second openings is narrower than the corresponding one of the first shield portions.

33. The method of claim 27, further comprising: forming a color filter layer on the second substrate, and the color filter layer and the quantum dot layer stacked with each other.

* * * * *